US012634474B2

(12) United States Patent
Wang et al.

(10) Patent No.: US 12,634,474 B2
(45) Date of Patent: May 19, 2026

(54) VIDEO DECODING METHOD, VIDEO ENCODING METHOD, DEVICE AND STORAGE MEDIUM

(71) Applicant: HANGZHOU HIKVISION DIGITAL TECHNOLOGY CO., LTD., Zhejiang (CN)

(72) Inventors: Yan Wang, Zhejiang (CN); Yucheng Sun, Zhejiang (CN); Fangdong Chen, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/870,536

(22) PCT Filed: May 24, 2023

(86) PCT No.: PCT/CN2023/096070
§ 371 (c)(1),
(2) Date: Nov. 29, 2024

(87) PCT Pub. No.: WO2023/231866
PCT Pub. Date: Dec. 7, 2023

(65) Prior Publication Data
US 2025/0324065 A1 Oct. 16, 2025

(30) Foreign Application Priority Data

May 31, 2022 (CN) .......................... 202210612716.1

(51) Int. Cl.
*H04N 7/12* (2006.01)
*H04N 19/14* (2014.01)
(Continued)

(52) U.S. Cl.
CPC ........... *H04N 19/14* (2014.11); *H04N 19/176* (2014.11); *H04N 19/184* (2014.11)

(58) Field of Classification Search
CPC ....................................................... H04N 19/14
See application file for complete search history.

(56) References Cited

U.S. PATENT DOCUMENTS

| | | | |
|---|---|---|---|
| 8,503,536 B2 | 8/2013 | Zuo et al. | |
| 2016/0301933 A1 | 10/2016 | Jacobson et al. | |
| 2019/0089957 A1 | 3/2019 | Zhang et al. | |

FOREIGN PATENT DOCUMENTS

| | | |
|---|---|---|
| CN | 112738515 A | 4/2021 |
| CN | 113784126 A | 12/2021 |

(Continued)

OTHER PUBLICATIONS

International Search Report for PCT/CN2023/096070, dated Aug. 23, 2023, 5 pages w/English Translation.
(Continued)

*Primary Examiner* — Young Lee
(74) *Attorney, Agent, or Firm* — Meunier Carlin & Curfman LLC

(57) ABSTRACT

Embodiments of the present application relates to the technical field of video decoding, and provide a video en/decoding method and apparatus and a storage medium, which are beneficial to improving the en/decoding efficiency. The method comprises: acquiring complexity information of a current block in an image to be processed, wherein the complexity information of the current block is obtained by calculating at least one angular gradient of the current block according to at least pixel values of the current block; determining quantization parameters of the current block
(Continued)

according to the complexity information of the current block; en/decoding the current block on the basis of the quantization parameters.

13 Claims, 12 Drawing Sheets

(51) Int. Cl.
　　*H04N 19/176* 　　(2014.01)
　　*H04N 19/184* 　　(2014.01)

(56) References Cited

FOREIGN PATENT DOCUMENTS

| | | |
|---|---|---|
| CN | 116095318 A | 5/2023 |
| JP | 0856360 A | 2/1996 |
| JP | 2013106316 A | 5/2013 |
| WO | 2013031574 A1 | 3/2013 |
| WO | 2019191983 A1 | 10/2019 |
| WO | 2019194422 A1 | 10/2019 |
| WO | 2021119145 A1 | 6/2021 |

OTHER PUBLICATIONS

Written Opinion for PCT/CN2023/096070, dated Aug. 23, 2023, 5 pages.

Lulin Chen, "AHG9/AHG12: On CTU row based slice chunks of a slice within a tile," MediaTek Inc., Joint Video Experts Team (JVET) of ITU-T SG 16 WP 3 and ISO/IEC JTC 1/SC 29/WG 11, 18th Meeting: by teleconference, Apr. 15-24, 2020.

Miaohui Wang, "An Efficient Frame-Content Based Intra Frame Rate Control for High Efficiency Video Coding," IEEE Signal Processing Letters, vol. 22, No. 7, Jul. 2015.

Notice of Allowance in corresponding JP application No. 2024-570913 issued on Mar. 10, 2026.

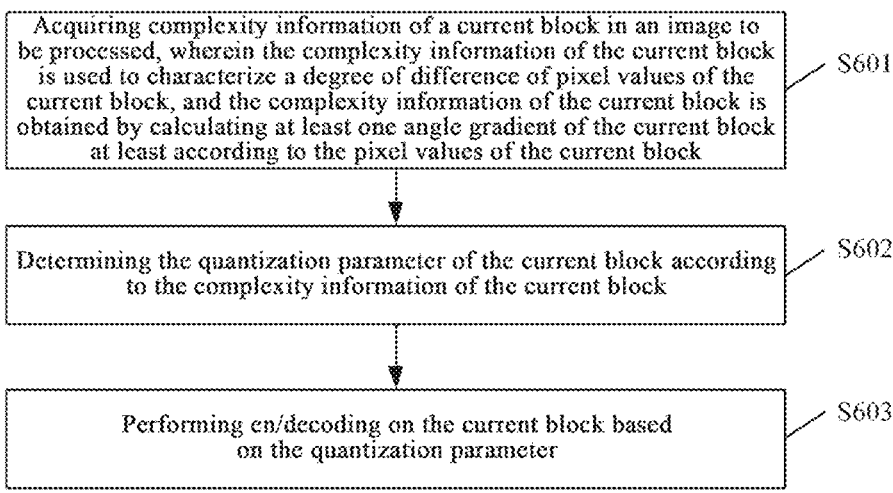

Acquiring complexity information of a current block in an image to be processed, wherein the complexity information of the current block is used to characterize a degree of difference of pixel values of the current block, and the complexity information of the current block is obtained by calculating at least one angle gradient of the current block at least according to the pixel values of the current block — S601

Determining the quantization parameter of the current block according to the complexity information of the current block — S602

Performing en/decoding on the current block based on the quantization parameter — S603

FIG. 6

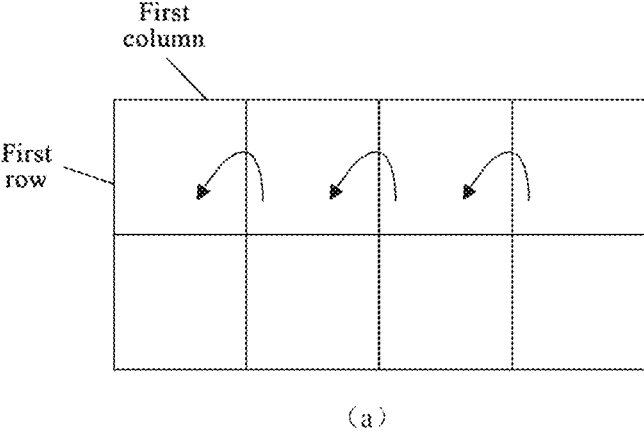

First column

First row (a)

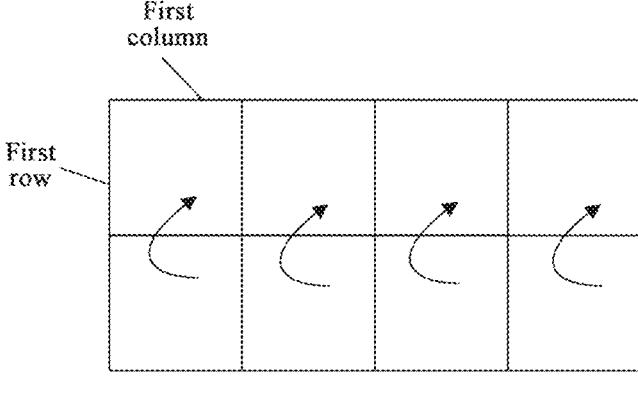

First column

First row (b)

FIG. 7

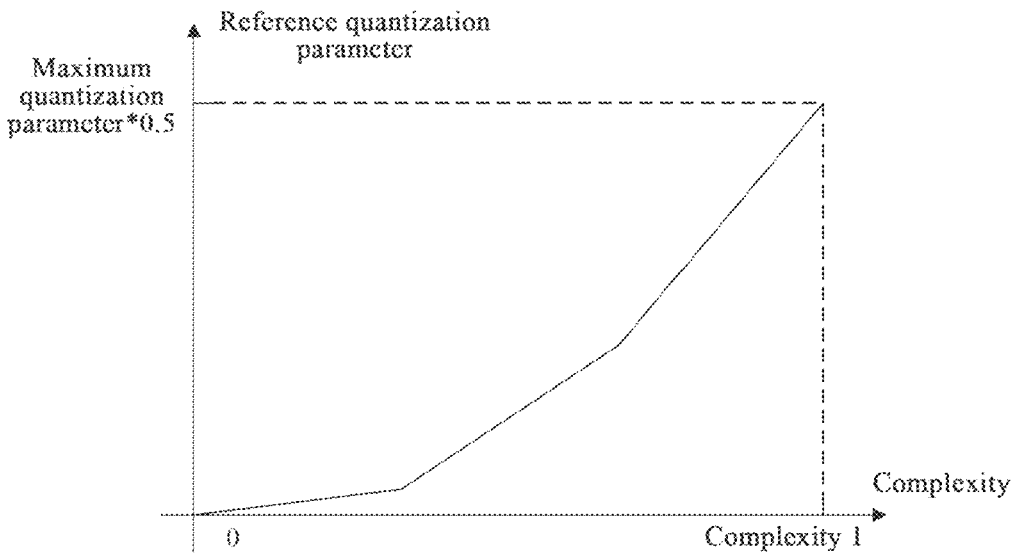
FIG. 12c
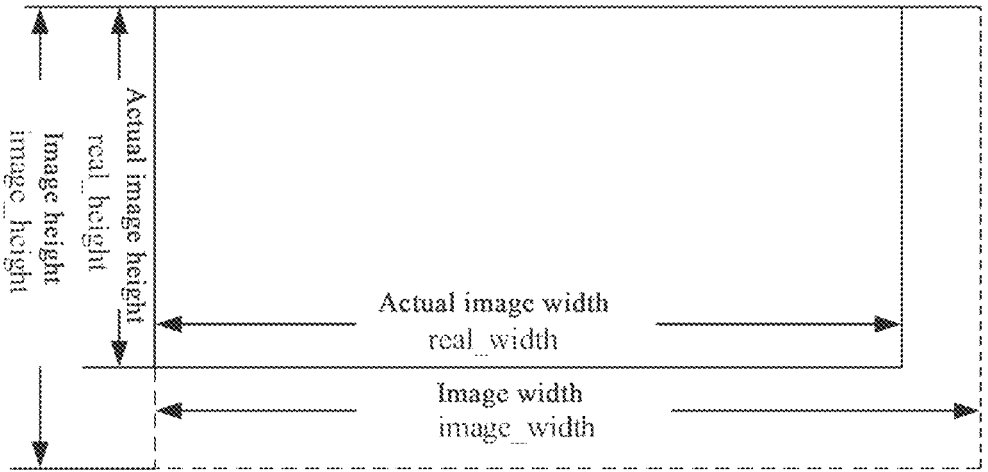
FIG. 13a
| ← slice width → | ← slice width → | | ← slice width → |
|---|---|---|---|
| Slice 1 | Slice 2 | ... | Slice N |
| Slice N+1 | Slice N+2 | ... | Slice 2N |
| ... | ... | ... | ... |
FIG. 13b

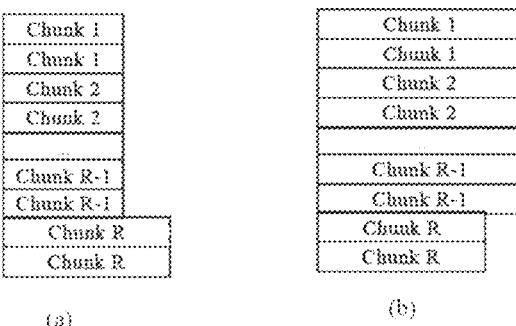
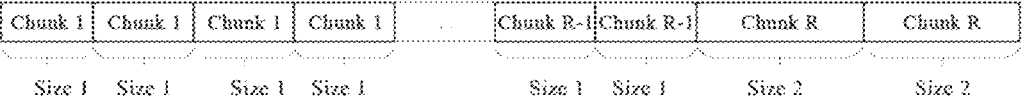
FIG. 15
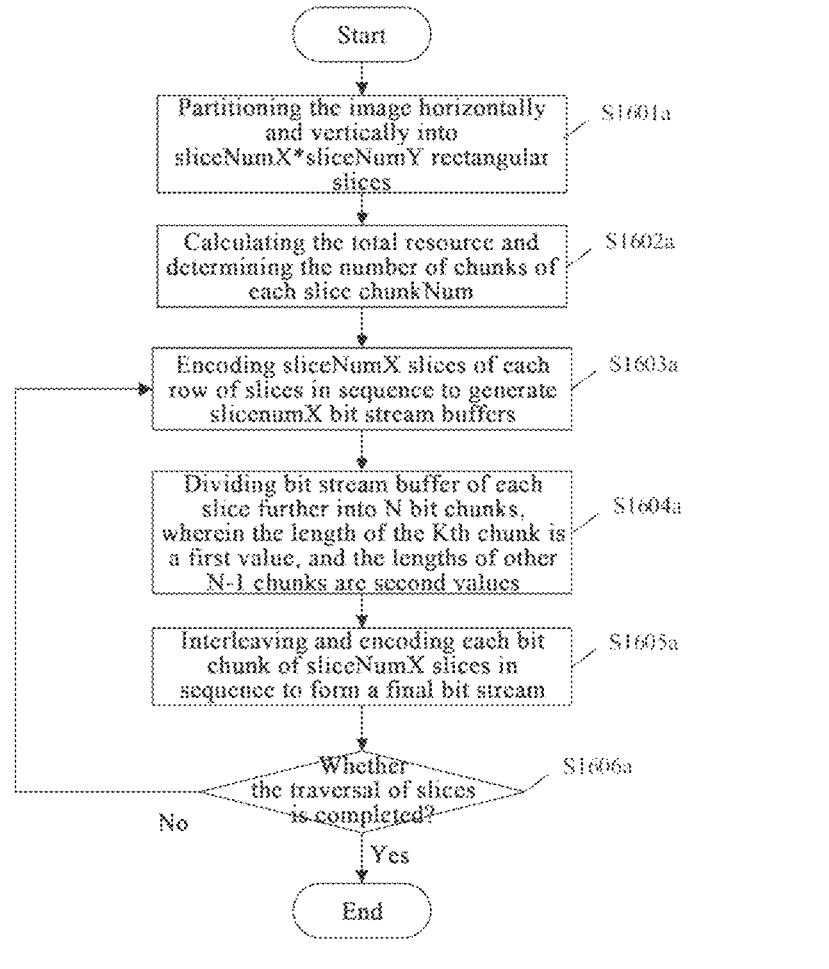
FIG. 16a

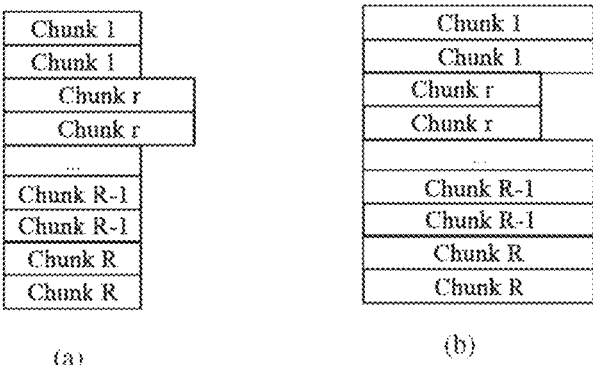
(a)                                    (b)
(c)
FIG. 17
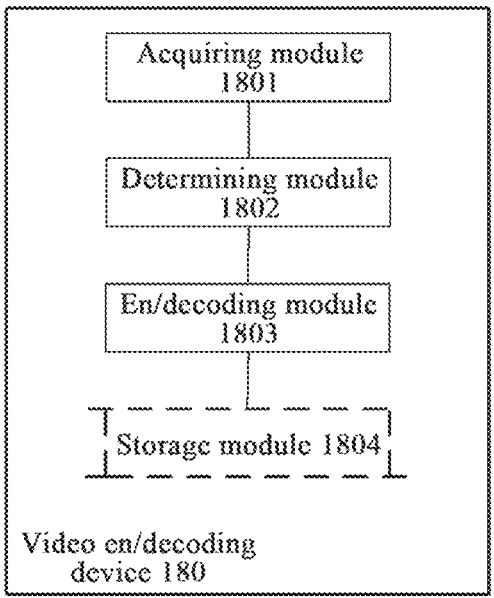
FIG. 18

VIDEO DECODING METHOD, VIDEO ENCODING METHOD, DEVICE AND STORAGE MEDIUM

CROSS REFERENCE TO RELATED APPLICATIONS

This application is a United States National Phase Application of International Patent Application Number PCT/CN2023/096070, filed on May 24, 2023, which claims the benefit of and priority to Chinese Patent Application No. 202210612716.1 filed with the China National Intellectual Property Administration on May 31, 2022 and entitled "VIDEO DECODING METHOD, VIDEO ENCODING METHOD, DEVICE AND STORAGE MEDIUM", which are incorporated herein by reference in their entirety.

TECHNICAL FIELD

The present application relates to the technical field of video en/decoding, and in particular to a video en/decoding method, device and storage medium.

BACKGROUND

A video en/decoding technology plays an important role in the field of video processing. Wherein, the video en/decoding technology includes video encoding and video decoding. In a process of video encoding and decoding, a process of performing quantization or inverse-quantization on an image in the video is a key to determine the quality of the image. In the process of quantization, the reduction of redundancy of the original data in the code stream is mainly achieved by replacing part of the original data in the code stream with quantization parameters. However, the process of quantization will bring a risk of image distortion. Therefore, in order to improve the efficiency of video en/decoding while taking into account the quality of the image, determining more accurate quantization parameters for the images in video is an urgent problem to be solved nowadays.

SUMMARY

Embodiments of the present application provide a video en/decoding method, device and a storage medium, which help to improve the efficiency of video en/decoding.

To achieve the above purpose, embodiments of the present application adopt following technical solutions:

In a first aspect, an embodiment of the present application provides a video en/decoding method, which is applied to a chip of a video encoding device, a video decoding device or a video encoding and decoding device, and the method including: acquiring complexity information of a current block in an image to be processed, wherein the complexity information of the current block is obtained by calculating at least one angle gradient of the current block at least according to pixel values of the current block; determining a quantization parameter of the current block according to the complexity information of the current block; en/decoding the current block based on the quantization parameter.

The quantization parameter plays an important role in the process of video encoding and decoding. By adopting the video en/decoding method proposed in the present application, the video en/decoding device acquires the complexity information of the current block in the image to be processed, wherein the complexity information is calculated based on information of the current block; determines the quantization parameter of the current block based on the complexity information and performs en/decoding. It takes the angle gradient information of the current block into account, which helps to determine a more accurate quantization parameter for the current block, thus improving the efficiency of the video en/decoding while taking into account the quality of the image. In addition, if the above method is used for video decoding, a decoding end acquires the complexity information of the current block from a code stream to determine the quantization parameter, it helps to reduce the resource occupied by the quantization parameter in the code stream, so that more effective data can be transmitted in the code stream and the transmission efficiency can be improved.

In a possible implementation, acquiring the complexity information of the current block in the image to be processed includes: calculating at least one angle gradient of the current block based on the pixel values of the current block and reconstructed values of en/decoded pixel values of the current block; acquiring the complexity information of the current block according to the at least one angle gradient of the current block.

In the possible implementation, calculating the complexity of the current block by means of the pixel values and reconstructed values of the current block, helps to determine a more accurate quantization parameter for the current block and improve the efficiency of the video en/decoding while taking into account the quality of the image.

In a possible implementation, acquiring the complexity information of the current block in the image to be processed includes: calculating at least one angle gradient of the current block based on the pixel values of the current block and pixel values adjacent to the current block in the image to be processed; acquiring the complexity information of the current block according to the at least one angle gradient of the current block.

In the possible implementation, the complexity of the current block is calculated by the pixel values of the current block and the pixel values adjacent to the current block, which helps to determine a more accurate quantization parameter for the current block and improve the en/decoding efficiency of the video while taking into account the image quality.

In a possible implementation, acquiring the complexity information of the current block in the image to be processed includes: acquiring the prediction angle adopted by an angle prediction mode of the current block; calculating the angle gradient based on the prediction angle to obtain the corresponding complexity information; taking the corresponding complexity information as the complexity information of the current block.

In the possible implementation, the corresponding complexity is determined by the angle prediction mode of the current block, which helps to determine a more accurate quantization parameter for the current block. For the decoding end, it helps to save resource in the code stream and improves the en/decoding efficiency of video.

In a possible implementation, the current block is an N-channel image block, and acquiring the complexity information of the current block in the image to be processed includes: acquiring the complexity information of the each channel image block based on the pixel values of each channel image block in the N-channel image block; wherein N is an integer greater than zero; determining the complexity information of the current block based on the complexity information of the each channel image block.

In the possible implementation, an implementation of determining the complexity of current block based on the complexity of multiple channel image blocks is provided, which improves the feasibility of the solution. In addition, dividing the image into multiple channels for separate calculation helps to improve the accuracy of the complexity information obtained from the determination.

In a possible implementation, acquiring the complexity information of each channel image block based on the pixel values of each channel image block in N-channel image block includes: dividing the each channel image block into at least two sub-blocks; determining complexity information of the at least two sub-blocks of each channel image block; determining the complexity information of the respective channel image block in each channel image block based on the complexity information of the at least two sub-blocks of the each channel image block.

In the possible implementation, an implementation of determining the complexity of the current block based on the complexity of multiple channel image blocks is provided, wherein, the complexity is determined by further dividing the multiple channel image blocks, which helps to improve the accuracy of the complexity information obtained from the determination.

In a possible implementation, determining the complexity information of the respective channel image block based on the complexity information of at least two sub-blocks of each channel image block includes: determining a minimum value in the complexity information of at least two sub-blocks of each channel image block as the complexity information of the respective channel image block.

In the possible implementation, an implementation of determining the complexity of multiple channel image blocks based on the complexity of the divided multiple channel image blocks is provided, which improves the feasibility of the solution.

In a possible implementation, determining the complexity information of the current block based on the complexity information of each channel image block includes: determining a minimum value in the complexity information of each channel image block as the complexity information of the current block.

In the possible implementation, an implementation of determining the complexity information of multiple channel image blocks based on the complexity information of multiple channel image blocks is provided, which improves the feasibility of the solution.

In a possible implementation, determining the complexity information of the current block based on the complexity information of each channel image block includes: determining a complexity level of each channel image block based on the complexity information of each channel image block; determining the complexity information of the current block based on the complexity level of each channel image block.

In the possible implementation, an implementation for determining the complexity of multiple channel image blocks based on the complexity of the divided multiple channel image blocks is provided, which improves the feasibility of the solution.

In a possible implementation, determining the quantization parameter of the current block according to the complexity information of the current block includes: determining a reference quantization parameter of the current block according to the complexity information of the current block; determining the quantization parameter of the current block according to the reference quantization parameter of the current block.

In the possible implementation, a method of determining quantization parameter based on the reference quantization parameter is provided to improve the accuracy of the quantization parameter determined.

In a possible implementation, when the video en/decoding method is a video encoding method, determining the reference quantization parameter of the current block according to the complexity information of the current block includes: acquiring buffer status of an image to be processed, wherein the buffer status is used to characterize the number of bits occupied by image blocks that has been encoded in the image to be processed in a buffer, and the buffer is used for controlling the uniform output of the code stream of the image to be processed; determining the reference quantization parameter of the current block according to a correspondence between the buffer status and the complexity information of the current block. Of course, when the above video en/decoding method is a video decoding method, the situation that the buffer buffers the code stream in the above encoding process can be simulated in the decoding process, so as to determine the reference quantization parameter according to the simulation result.

In the possible implementation, an implementation of determining the reference quantization parameter of the current block according to the buffer status and the complexity information of the current block is provided, which improves the feasibility of the solution.

In a possible implementation, determining the reference quantization parameter of the current block according to the complexity information of the current block includes: determining a complexity level of the current block; determining corresponding target bits according to the complexity level of the current block, wherein the target bits refers to the number of bits occupied by the current block in the code stream; acquiring a reference quantization parameter of the current block according to the target bits.

In the possible implementation, an implementation of determining the reference quantization parameter of the current block according to the target bits is provided, which improves the feasibility of the solution.

In a possible implementation, determining the quantization parameter of the current block according to the reference quantization parameter of the current block includes: determining a weighting coefficient according to the complexity information of the current block, wherein the weighting coefficient is used for adjusting a quantization parameter of the current block according to the complexity of the current block; determining the quantization parameter of the current block according to the weighting coefficient and the reference quantization parameter of the current block.

In the possible implementation, an implementation of determining the quantization parameter of the current block according to the reference quantization parameter is provided, which improves the feasibility of the solution.

In a possible implementation, the complexity information of the current block is calculated based on a code rate control unit of the current block, and the code rate control unit is a basic processing unit for calculating the complexity information of the current block; the quantization parameter of the current block is the quantization parameter of the code rate control unit of the current block, and en/decoding the current block based on the quantization parameter of the current block includes: determining the quantization parameter of the en/decoding unit of the current block according to the quantization parameter of the code rate control unit; performing en/decoding on the current block according to the quantization parameter of the en/decoding unit.

In the possible implementation, an implementation mode of determining the quantization parameter of the current block is provided, wherein when the size of the code rate control unit is smaller than the size of the quantization unit, multiple quantization parameters obtained by corresponding calculation are used for quantization in one quantization unit. To solve this problem, the above method provides a corresponding solution and improves the feasibility of the solution.

In a second aspect, an embodiment of the present application provides a video en/decoding device, which has the function of realizing any one of the video en/decoding methods in the above first aspect. This function can be realized by hardware or by corresponding software executed on hardware. The hardware or software includes one or more modules corresponding to the above functions.

In a third aspect, an embodiment of the present application provides a video encoder for executing any one of the video en/decoding methods in the above first aspect.

In a fourth aspect, an embodiment of the present application provides another video encoder, which includes a processor and a memory; wherein the memory is used to store computer-executed instructions, and when the video encoder runs, the processor executes the computer-executed instructions stored in the memory, so that the video encoder can perform any one of the video en/decoding methods in the above first aspect.

In a fifth aspect, an embodiment of the present application provides a video decoder, which is used to perform any one of the video en/decoding methods in the above first aspect.

In a sixth aspect, an embodiment of the present application provides another video decoder, which includes a processor and a memory; wherein the memory is used to store computer-executed instructions, and when the video decoder runs, the processor executes the computer-executed instructions stored in the memory, so that the video decoder can perform any one of the video en/decoding methods in the above first aspect.

In a seventh aspect, an embodiment of the present application provides a machine-readable storage medium having a program stored thereon, wherein the program, when runs on a computer, causes the computer to perform any one of the video en/decoding methods in the above first aspect.

In an eighth aspect, an embodiment of the present application provides a computer program product including instructions, which, when runs on a computer, causes the computer to perform any one of the video en/decoding methods in the above first aspect.

In a ninth aspect, an embodiment of the present application provides an electronic device, which includes a video en/decoding device, and a processing circuit is configured to perform any one of the video en/decoding methods in the above first aspect.

In a tenth aspect, an embodiment of the present application provides a chip, which includes a processor, the processor is coupled with a memory, and the memory stores program instructions, and when the program instructions stored in the memory are executed by the processor, any one of the video en/decoding methods in the above first aspect is realized.

In an eleventh aspect provides a video encoding and decoding system, which includes a video encoder configured to perform any one of the video en/decoding methods in the above first aspect and a video decoder configured to perform any one of the video en/decoding methods in the above first aspect.

The technical effects brought by any of the implementations in the second to eleventh aspects can refer to the technical effects brought by the corresponding implementations in the first aspect or in the following specific implementations, and will not be repeated here.

BRIEF DESCRIPTION OF THE DRAWINGS

The accompanying drawings described herein are intended to provide a further understanding of the present application and constitute a part of the present application. The illustrative embodiments of the present application and their descriptions are used to explain the present application and do not constitute undue limitations of the present application.

FIG. 6 is a flowchart of a video encoding and decoding method provided by an embodiment of the present application;

FIG. 7 is a schematic diagram of calculating an angle gradient provided by an embodiment of the present application;

FIG. 12*c* is a graph of a function of a reference quantization parameter and complexity information provided by an embodiment of the present application;

FIG. 13*a* is a schematic diagram of an image boundary provided by an embodiment of the present application;

FIG. 13*b* is a schematic diagram of a slice provided by an embodiment of the present application;

FIG. 15 is a schematic diagram of interleaving of chunks based on the code stream grouping method provided by an embodiment of the present application;

FIG. 16*a* is a schematic diagram of a flowchart of a code stream grouping method at an encoding end provided by an embodiment of the present application;

FIG. 17 is a schematic diagram of interleaving of chunks based on the code stream grouping method provided by an embodiment of the present application; and FIG. 18 is a schematic diagram of a form of a video en/decoding device provided by an embodiment of the present application.

DETAILED DESCRIPTION

Figure 1:
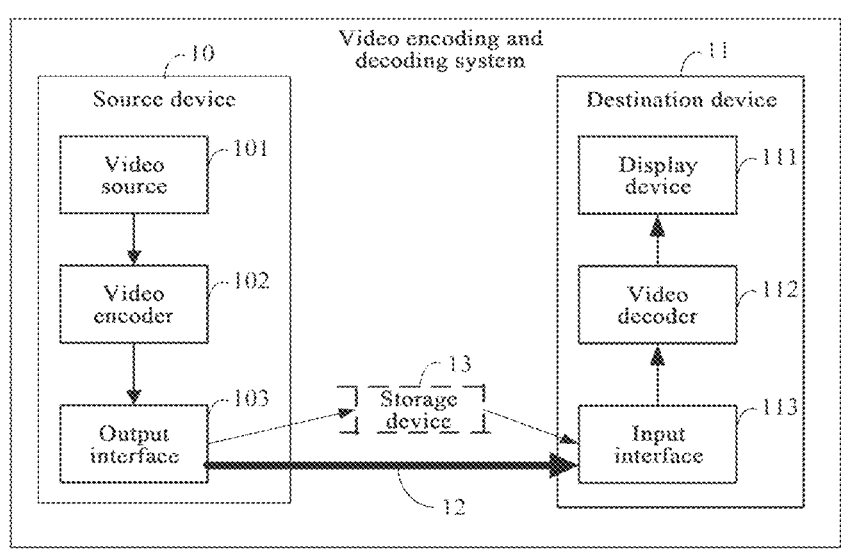
FIG. 1 is a system architecture diagram of a video encoding and decoding system provided by an embodiment of the present application.

In order to make the objective, technical solutions and advantages of the present application clearer, the present application will be described in more details below with a reference to the accompanying drawings and embodiments. Obviously, the described embodiments are only a part of, and not all of the embodiments of the present application. All other embodiments obtained by those skilled in the art on the basis of the embodiments of the present application fall into the scope of protection of the present application.

In the description of the present application, unless otherwise specified, "/" means "or", for example, A/B may mean A or B. In this paper, "and/or" is only a kind of relationship that describes the related objects, indicating that there may be three kinds of relationships, for example, A and/or B, which may mean that A exists alone, both A and B exist, and B exists alone. In addition, "at least one" means one or more, and "multiple" means two or more. The words "first" and "second" do not limit the quantity and execution order, and the words "first" and "second" do not necessarily mean difference.

It should be noted that in the present application, the words "exemplary" or "for example" are used to indicate an example, illustration or explanation. Any embodiment or design solution described as "exemplary" or "for example" in the present application should not be interpreted as being preferred or advantageous over other embodiments or design solutions. Specifically, the use of words such as "exemplary" or "for example" aims to present a related concept in a specific way.

First, the technical terms involved in the embodiments of the present application are introduced:

1. Video En/Decoding Technology

Video en/decoding technology includes video encoding technology and video decoding technology, which can also be collectively referred to as video coding and decoding technology.

The video sequence has a series of redundant information such as spatial redundancy, temporal redundancy, visual redundancy, information entropy redundancy, structural redundancy, knowledge redundancy and importance redundancy, and so on. In order to remove as much redundant information from the video sequence as possible and reduce the amount of data characterizing the video, the video encoding technology is proposed, to achieve the effect of reducing storage space and saving transmission bandwidth. Video encoding technology is also called video compression technology.

In order to acquire data stored or transmitted based on the above video compression technology, video decoding technology is required accordingly.

Within the international scope, a video compression encoding standard is used to standardize video encoding and decoding methods, such as Advanced Video Coding (AVC) in Part 10 of MPEG-2 and MPEG-4 standards formulated by Motion Picture Experts Group (MPEG), and H.263, H.264 and H.265 (also called High Efficiency Video Coding Standard (HEVC)) formulated by the International Telecommunication Union-Telecommunication Standardization Sector (ITU-T).

It should be noted that in an encoding algorithm based on hybrid encoding architecture, the above compression encoding methods can be used in a mixed manner.

The basic processing unit in the video encoding and decoding process is an image block, which is obtained by dividing a frame/an image by the encoding end. The image blocks obtained after division are usually processed row by row and one by one. Wherein, an image block being processed is called a current block, and an image block that has been processed is called an encoded image block, or a decoded image block, or an en/decoded image block. Taking HEVC as an example, HEVC defines Coding Tree Unit (CTU), Coding Unit (CU), Prediction Unit (PU) and Transform Unit (TU). Any of the CTU, CU, PU and TU can be used as an image block after division. Wherein, the CU is based for division for both PU and TU.

2. Video Sampling

A pixel is the smallest complete sample of a video or an image. Therefore, the data processing of an image block is done in unit of pixels. Wherein, each pixel records color information. One way of sampling is to represent colors by RGB, which includes three image channels, wherein R represents red, G represents green, and B represents blue. Another way of sampling is to represent color by YUV, which includes three image channels, wherein Y represents luminance, U represents first chrominance Cb, and V represents second chrominance Cr. Since humans are more sensitive to luminance than to chrominance, the storage space can be reduced by storing more data characterizing luminance and less data characterizing chrominance. Specifically, in video encoding and decoding, YUV format is typically used for video sampling, which includes 420 sampling format, 422 sampling format, etc. The sampling format determines the sampling number of two chrominances based on the sampling number of luminance. For example, assuming a CU has 4×2 pixels, in the following format:

[Y0, U0, V0] [Y1, U1, V1] [Y2, U2, V2] [Y3, U3, V3];
[Y4, U4, V4] [Y5, U5, V5] [Y6, U6, V6] [Y7, U7, V7];

The 420 sampling format indicates that the YUV is sampled in a format of 4:2:0, that is, the luminance and the first chrominance or the second chrominance are selected in a ratio of 4:2, wherein the first chrominance and the second chrominance are selected in alternate rows. Then the above CU sampling selects the luminance Y0-Y3 in the first row and the first chrominance U0 and U2, and selects the luminance Y4-Y7 in the second row and the second chrominance V4 and V6. The sampled CU consists of a luminance encoding unit and a chrominance encoding unit, wherein the luminance encoding unit is:

[Y0] [Y1] [Y2] [Y3];
[Y4] [Y5] [Y6] [Y7];

the first chrominance encoding unit is:

[U0] [U2];

the second chrominance encoding unit is:

[V4] [V6];

It can be seen that the size of the image block after being sampled in the above sampling format has changed. The size of the luminance encoding unit block remains unchanged at 4×2, while the size of the first chrominance encoding unit block changes to 2×1 and the size of the second chrominance encoding unit block also changes to 2×1. Therefore, if the size of CU is assumed to be X×Y, the size of chrominance encoding unit block after being sampled based on a 420 sampling format is X/2×Y/2.

Similarly, the 422 sampling format indicates that YUV is sampled in a format of 4:2:2, that is, the luminance, the first chrominance and the second chrominance are selected in a ratio of 4:2:2. Then the sampled luminance encoding unit of the CU is:

[Y0] [Y1] [Y2] [Y3];

[Y4] [Y5] [Y6] [Y7];

the first chrominance encoding unit is:

[U0] [U2];

[U4] [U6];

the second chrominance encoding unit is:

[V1] [V3];

[V5] [V7];

wherein, the size of the luminance encoding unit block remains unchanged at 4×2, while the size of the first chrominance encoding unit block changes to 2×2 and the size of the second chrominance encoding unit block also changes to 2×2. Therefore, if the size of CU is assumed to be X×Y, the size of chrominance encoding unit block after being sampled based on a 422 sampling format is X/2×Y.

The luminance encoding unit, the first chrominance encoding unit and the second chrominance encoding unit obtained by sampling as described above are used as data units of each channel for subsequent processing of the current block.

The en/decoding method provided by the present application is applicable to a video encoding and decoding system. The video encoding and decoding system can also be referred to as video en/decoding system. FIG. 1 shows the structure of the video encoding and decoding system.

As shown in FIG. 1, a video encoding and decoding system includes a source device 10 and a destination device 11. The source device 10 generates encoded video data, the source device 10 can also be referred to as a video encoding device or a video encoding apparatus, and the destination device 11 can decode the encoded video data generated by the source device 10, the destination device 11 can also be referred to as a video decoding device or a video decoding apparatus. The source device 10 and/or the destination device 11 may include at least one processor and a memory coupled to the at least one processor. The above memory may include, but is not limited to, a Read-Only Memory (ROM), a Random Access Memory (RAM), an Electrically Erasable Programmable Read-Only Memory (EEPROM), a flash memory, or any other medium that can be used to store the desired program code in the form of instructions or data structures accessible by a computer, which is not specifically limited in the present application.

The source device 10 and the destination device 11 may include various devices, including desktop computers, mobile computing devices, notebook (e.g., laptop) computers, tablet computers, set-top boxes, telephone handsets such as so-called "smart" phones, televisions, cameras, display devices, digital media players, video game consoles, vehicle-mounted computers or the similar electronic devices.

The destination device 11 may receive encoded video data from the source device 10 via a link 12. The link 12 may include one or more media and/or devices capable of moving encoded video data from the source device 10 to the destination device 11. In one instance, the link 12 may include one or more communication media that enable the source device 10 to directly transmit the encoded video data to the destination device 11 in real time. In this instance, the source device 10 may modulate the encoded video data according to a communication standard (e.g., a wireless communication protocol) and may transmit the modulated video data to the destination device 11. The above one or more communication media may include a wireless and/or wired communication media, such as a Radio Frequency (RF) spectrum and one or more physical transmission lines. The above one or more communication media may form a part of packet-based network, such as local area network, wide area network or global network (e.g., the Internet). The above one or more communication media may include routers, switches, base stations, or other devices that enable communication from the source device 10 to the destination device 11.

In another instance, the encoded video data may be output from the output interface 103 to the storage device 13. Similarly, the encoded video data can be accessed from the storage device 13 via the input interface 113. The storage device 13 may include various locally accessible data storage media, such as a Blu-ray Disc, a Digital Video Disc (DVD), a Compact Disc Read-Only Memory (CD-ROM), a flash memory, or other suitable digital storage media for storing encoded video data.

In another instance, the storage device 13 may correspond to a file server or another intermediate storage device that stores the encoded video data generated by the source device 10. In this instance, the destination device 11 can acquire, from the storage device 13, the video data stored therein through streaming or downloading. The file server may be any type of server capable of storing encoded video data and transmitting the encoded video data to the destination device 11. For example, a file server may include a World Wide Web (Web) server (for example, for a website), a File Transfer Protocol (FTP) server, a Network Attached Storage (NAS) device, and a local disk drive.

The destination device 11 can access the encoded video data via any standard data connection (for example, Internet connection). The type of data connection instances include wireless channels, wired connections (e.g., cable modems, etc.), or a combination of both, which are suitable for accessing encoded video data stored on a file server. The encoded video data can be transmitted from the file server by streaming, downloading or a combination of both.

The en/decoding method of the present application is not limited to wireless application scenarios. For example, the en/decoding method of the present application can be applied to video encoding and decoding that supports a variety of multimedia applications as follows: over-the-air television broadcasting, cable television transmissions, satellite television transmissions, streaming video transmissions (for example, via the Internet), encoding of video data stored on a data storage media, decoding of video data stored on the data storage media, or other applications. In some instances, the video encoding and decoding system can be configured to support unidirectional or bidirectional video transmission to support applications such as video streaming, video playing, video broadcasting and/or video telephony.

It should be noted that FIG. 1 is a system architecture diagram of a video encoding and decoding system provided by an embodiment of the present application, and FIG. 1 is only an example of a video encoding and decoding system, and is not a limitation of the video encoding and decoding system in the present application. The en/decoding method provided by the present application can also be applicable to a scenario where there is no data communication between the encoding device and the decoding device. In other instances, the video data to be encoded or the encoded video data can be retrieved from local storage, or can be streamed on the network, and the like. The video encoding device can encode the video data to be encoded and store the encoded video data in the memory, and the video decoding device can also acquire the encoded video data from the memory and decode the same.

In FIG. 1, a source device 10 includes a video source 101, a video encoder 102 and an output interface 103. In some instances, the output interface 103 may include a modulator/demodulator (modem) and/or a transmitter. The video source 101 may include a video capture device (e.g., a camera), a video archive containing previously captured video data, a video input interface for receiving video data from a video content provider, and/or a computer graphics system for generating video data, or a combination of these sources of video data.

The video encoder 102 may encode video data from the video source 101. In some instances, the source device 10 directly transmits the encoded video data to the destination device 11 via the output interface 103. In other instances, the encoded video data can also be stored on the storage device 13 for later access by the destination device 11 for decoding and/or playing.

In the instance of FIG. 1, the destination device 11 includes a display device 111, a video decoder 112, and an input interface 113. In some instances, the input interface 113 includes a receiver and/or a modem. The input interface 113 may receive encoded video data via the link 12 and/or from the storage device 13. The display device 111 may be integrated with the destination device 11 or may be external to the destination device 11. Generally, the display device 111 displays the decoded video data. The display device 111 may include various display devices, for example, a liquid crystal display, a plasma display, an organic light emitting diode display, or other types of display devices.

Optionally, the video encoder 102 and the video decoder 112 may be respectively integrated with the audio encoder and decoder, and may include appropriate multiplexer-demultiplexer units or other hardware and software to handle the encoding of both audio and video in a common data stream or separate data streams.

The video encoder 102 and the video decoder 112 may include at least one microprocessor, a Digital Signal Processor (DSP), an Application-Specific Integrated Circuit (ASIC), a Field Programmable Gate Array (FPGA), discrete logic, hardware or any combination thereof. If the en/decoding method provided by the present application is implemented by software, the instructions for the software can be stored in a suitable nonvolatile computer-readable storage medium, and the instructions can be executed by at least one processor to implement the present application.

The video encoder 102 and the video decoder 112 in the present application can operate according to a video compression standard (for example, HEVC) or other industry standards, which is not specifically limited in the present application.

Figure 2:
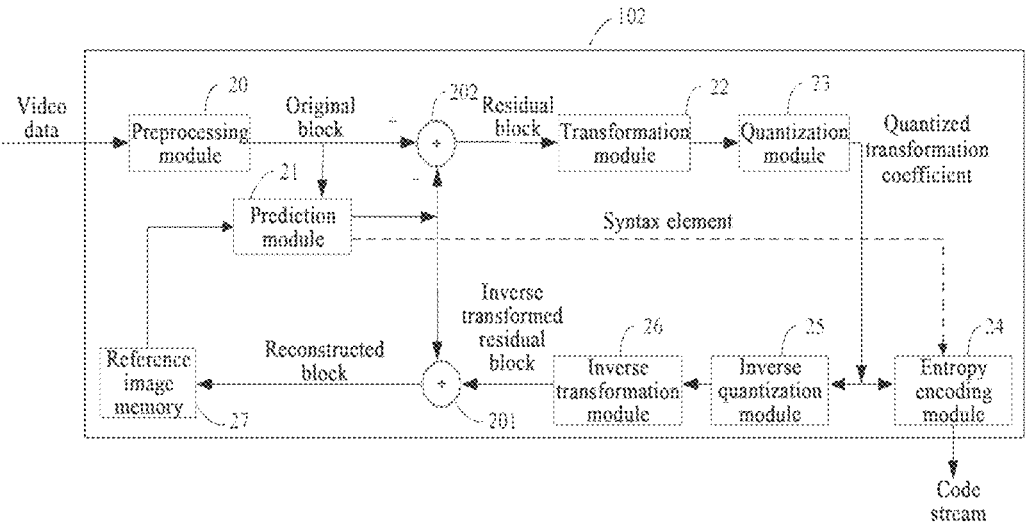
FIG. 2 is a schematic diagram of a structure of a video encoder provided by an embodiment of the present application.

FIG. 2 is a schematic diagram of a structure of a video encoder 102 provided by an embodiment of the present application. The video encoder 102 can perform prediction, transformation, quantization and entropy encoding in a prediction module 21, a transformation module 22, a quantization module 23 and an entropy encoding module 24, respectively. The video encoder 102 also includes a preprocessing module 20 and a summator 202, wherein the preprocessing module 20 includes a partition module and a code rate control module. For video block reconstruction, the video encoder 102 also includes an inverse quantization module 25, an inverse transformation module 26, a summator 201 and a reference image memory 27.

As shown in FIG. 2, the video encoder 102 receives video data, and the preprocessing module 20 is used to obtain input parameters of the video data. Wherein, the input parameters include a resolution of an image, a sampling format of the image, bits per pixel (bpp), bit width and other information in the video data. Wherein, bpp refers to the number of bits occupied by a pixel component in a unit pixel. Bit width refers to the number of bits occupied by a unit pixel. For example, a pixel is represented by the values of three pixel components in RGB. If each pixel component occupies 8 bits, the pixel depth of the pixel is 8, and the bit width of the pixel is 3×8=24 bits.

The partition module in the preprocessing module 20 partitions the image into original blocks. This partition may also include partition into slices, image blocks or other larger units, and (for example), video block partition according to the quadtree structure of CU and Largest encoding unit (LCU). Exemplarily, the video encoder 102 is an assembly for encoding video blocks located in a video slice to be encoded. Generally, a slice can be divided into multiple original blocks (and can be divided into a set of original blocks called image blocks). The sizes of CUs, PUs and TUs are usually determined in the partition module. In addition, the partition module is also used to determine the size of the code rate control unit. The code rate control unit refers to a basic processing unit in the code rate control module. The code rate control unit can be used to calculate a quantization parameter of the current block. For example, the code rate control module calculates, based on the code rate control unit, the complexity information for the current block, and then calculates the quantization parameter of the current block according to the complexity information. Wherein, the partition strategy of the partition module can be preset, or can be continuously adjusted based on an image during the encoding process. When the partition strategy is a preset strategy, the same partition strategy is also preset in the decoding end accordingly, so as to acquire the same image processing unit. The image processing unit is any one of the above-mentioned image blocks, and corresponds to the encoding side one by one. When the partition strategy is continuously adjusted based on the image during the encoding process, it can be directly or indirectly encoded into the code stream, and accordingly, the decoding end acquires corresponding parameters from the code stream to obtain the same partition strategy and acquire the same image processing unit.

The code rate control module in the preprocessing module 20 is used to generate a quantization parameter so that the quantization module 23 and the inverse quantization module 25 can perform relevant calculation. Wherein, during the process of calculating the quantization parameter, the code rate control module can acquire the image information of the current block for calculation, such as the above input information; it can also acquire a reconstructed value obtained by the reconstruction through the summator 201 for calculation, which is not limited in the present application.

The prediction module 21 can provide a prediction block to the summator 202 to generate a residual block, and provide the prediction block to the summator 201 to be reconstructed to obtain a reconstructed block, which is used as a reference pixel for subsequent prediction. Wherein, the video encoder 102 subtracts the pixel value of the prediction block from the pixel value of the original block to form a pixel difference, which is a residual block, and the data in the residual block may include luminance difference and chrominance difference. The summator 201 represents one or more assemblies that perform this subtraction operation. The prediction module 21 can also send relevant syntax elements to the entropy encoding module 24 for merging into the code stream.

The transformation module 22 can divide the residual block into one or more TUs for transformation. The transformation module 22 may transform the residual block from a pixel domain to a transform domain (e.g., a frequency domain). For example, the residual block is transformed to obtain a transformation coefficient using a Discrete Cosine Transform (DCT) or a Discrete Sine Transform (DST). The transformation module 22 may send the obtained transformation coefficient to the quantization module 23.

The quantization module 23 may perform quantization based on the quantization unit. Wherein, the quantization unit can be the same as the CU, TU and PU mentioned above, and can also be further divided in the partition module. The quantization module 23 quantizes the transformation coefficient to further reduce the encoding bits to obtain a quantized coefficient. Wherein, the quantization process may reduce the bit depth associated with some or all of the coefficients. The degree of quantization can be modified by adjusting the quantization parameter. In some feasible embodiments, the quantization module 23 may then perform a scan of a matrix containing quantized transformation coefficients. Alternatively, the entropy encoding module 24 may perform the scan.

After quantization, the entropy encoding module 24 may perform entropy encoding on the quantized coefficient. For example, the entropy encoding module 24 may perform a Context-Adaptive Variable-Length encoding (CAVLC), the Context-based Adaptive Binary Arithmetic encoding (CABAC), a Syntax-based Context-based Adaptive Binary Arithmetic Coding (SBAC), a Probability Interval Partition Entropy (PIPE) en/decoding and decoding, or another entropy encoding method or technology. The code stream is obtained after the entropy encoding is performed by the entropy encoding module 24, and the code stream can be transmitted to the video decoder 112 or archived for transmission or being retrieved by the video decoder 112 later.

The inverse quantization module 25 and the inverse transformation module 26 apply inverse quantization and inverse transformation respectively, and the summator 201 adds the residual block obtained after being inverse transformed and the predicted residual block to generate a reconstructed block, which is used as a reference pixel for a subsequent prediction of the original block. The reconstructed block is stored in the reference image memory 27.

Figure 3:
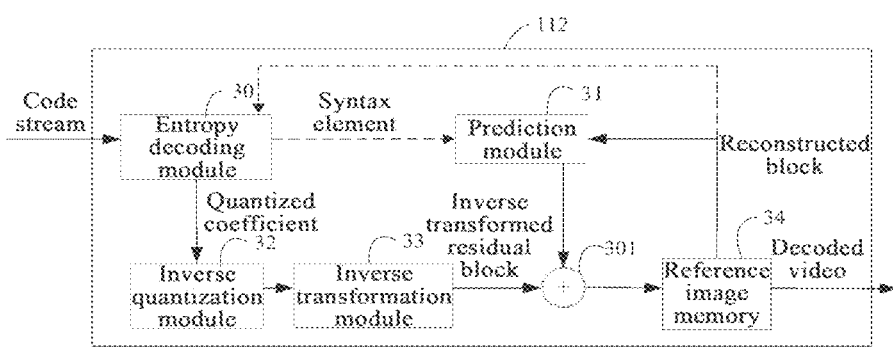
FIG. 3 is a schematic diagram of a structure of a video decoder provided by an embodiment of the present application.

FIG. 3 is a schematic diagram of a structure of a video decoder 112 provided by an embodiment of the present application. As shown in FIG. 3, the video decoder 112 includes an entropy decoding module 30, a prediction module 31, an inverse quantization module 32, an inverse transformation module 33, a summator 301 and a reference image memory 34. Wherein, the entropy decoding module 30 includes a parsing module and a code rate control module. In some feasible embodiments, the video decoder 112 may perform a decoding flow that inverses to the encoding flow performed by the video encoder 102 as described in FIG. 2.

During the decoding process, the video decoder 112 receives a code stream of the encoded video from the video encoder 102. The parsing module in the entropy decoding module 30 of the video decoder 112 performs entropy decoding on the code stream to generate quantized coefficients and syntax elements. The entropy decoding module 30 transmits the syntax elements to the prediction module 31. The video decoder 112 may receive the syntax elements at the video slice level and/or the video block level.

The code rate control module in the entropy decoding module 30 generates quantization parameters according to information of an image to be decoded obtained by the parsing module, so that the inverse quantization module 32 can perform relevant calculation. The code rate control module can also calculate quantization parameters according to the reconstructed block obtained by the reconstruction through the summator 301.

The inverse quantization module 32 performs inverse quantization (e.g., dequantization) on the quantized coefficients provided in the code stream and decoded by the entropy decoding module 30 and the generated quantization parameter. The inverse quantization process may include a process of determining a degree of quantization using the quantization parameter calculated by the video encoder 102 for each video block in a video slice. Similarly, the inverse quantization process may further include a process of determining a degree of application of inverse quantization. The inverse transformation module 33 applies inverse transformation (for example, transformation methods such as DCT and DST, etc.) to the inverse quantized transformation coefficients, and performs inverse transformation on the inverse quantized transformation coefficients to obtain an inverse transformation unit, that is, a residual block. Wherein, a size of the inverse transformation unit can be the same as that of TU, and the inverse transformation method and transformation method adopt forward transformation and corresponding inverse transformation in the same transformation method, for example, inverse transformations of DCT and DST are inverse DCT, inverse DST, or a conceptually similar inverse transformation process.

After the prediction module 31 generates a prediction block, the video decoder 112 forms a decoded image block by summing the inverse transformed residual block from the inverse transformation module 33 with the prediction block. Summator 301 represents one or more assemblies that perform this summation operation. If required, a deblocking filter can also be applied to filter an image of the decoded block in order to remove block effect artifacts. The decoded image block in a given frame or image are stored in the reference image memory 34 as a reference pixel for subsequent prediction.

Figure 4:
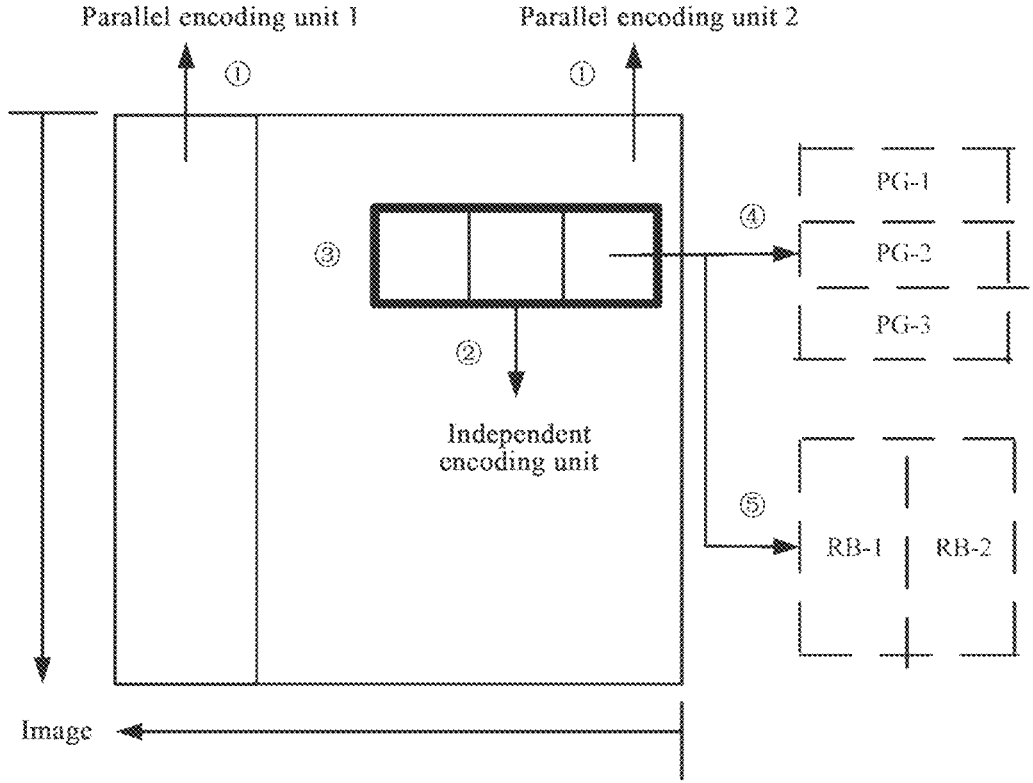
FIG. 4 is a schematic diagram of a process of a video encoding and decoding provided by an embodiment of the present application.

The present application provides a possible video encoding/decoding implementation, as shown in FIG. 4, which is a schematic diagram of a process of a video encoding and decoding provided by the present application. The video encoding/decoding implementation includes process ① to process ⑤, which can be performed by any one or more of the above-mentioned source device 10, video encoder 102, destination device 11 or video decoder 112.

Taking the video encoding process as an example to explain the above processes ① to ⑤ below.

Process ①: Dividing a frame of image into one or more parallel encoding units that do not overlap each other. The one or more parallel encoding units have no dependency on each other, and can be encoded and decoded completely in parallel/independently, such as parallel encoding unit 1 and parallel encoding unit 2 shown in FIG. 4.

Process ②: Each parallel encoding unit can be further divided into one or more independent encoding units that do not overlap each other. All the independent encoding units may not depend on each other, but can share some parallel encoding unit header information.

The independent encoding unit can either include three components of luminance Y, first chrominance Cb and second chrominance Cr, or three components of RGB, or it can include only one of the components. If the independent encoding unit includes three components, the sizes of these three components can be exactly the same or different, which depends on the input format of the image. The independent encoding unit can also be understood as one or more processing units formed by N-channels contained in each parallel encoding unit. For example, the above three components of Y, Cb and Cr are the three channels constituting the parallel encoding unit, of which each can be an independent encoding unit, or, Cb and Cr can be collectively referred to as a chrominance channel, and then the parallel encoding unit includes an independent encoding unit consisting of a luminance channel and an independent encoding unit consisting of a chrominance channel.

Process ③: Each independent encoding unit can be further divided into one or more encoding units that do not overlap each other. All the encoding units in the independent encoding unit may depend on each other, for example, multiple encoding units can be pre-encoded and pre-decoded with reference to each other.

If the encoding unit has the same size as the independent encoding unit (that is, the independent encoding unit is only divided into only one encoding unit), it can be of all the sizes described in Process ②.

The encoding unit can either include three components of luminance Y, first chrominance Cb and second chrominance Cr (or three components of RGB), or it can include only one of the components. If three components are included, the sizes of these components can be exactly the same or different, which depends on the input format of the image.

It is worth noting that process ③ is an optional step in the video encoding and decoding method, and the video encoder/decoder can encode/decode the residual coefficient (or residual value) of the independent encoding unit obtained in process ②.

Process ④: The encoding unit can be further divided into one or more Prediction Group (PG) that do not overlap each other, which can also be referred to as Group for short. Each PG is encoded and decoded according to a selected prediction mode to obtain a prediction value of PG, which constitutes the prediction value of the whole encoding unit. Based on the prediction value and the original value of the encoding unit, the residual value of the encoding unit is obtained. For example, in FIG. 4, one encoding unit of the independent encoding unit is divided into PG-1, PG-2 and PG-3.

Process ⑤: Based on the residual values of encoding units, encoding units are grouped to obtain one or more residual blocks (RBs) that do not overlap each other, and the residual coefficients of all of RBs are encoded and decoded according to the selected mode to form a residual coefficient stream. Specifically, the residual coefficients can be divided into two categories: transformed and untransformed. As shown in FIG. 4, grouping is performed on one encoding unit and RB-1 and RB-2 are obtained.

Wherein, the selected mode of the method of encoding and decoding residual coefficients in process ⑤ may include, but is not limited to, any of the following: a semi-fixed length encoding method, an exponential Golomb encoding method, a Golomb-Rice encoding method, a truncated unary code encoding method, a run-length encoding method, a direct encoding method of original residual values, etc. For example, when the exponential Colomb encoding method is selected to encode the residual coefficient of each RB, it is also need to select a decoding method corresponding to the exponential Columb encoding method to decode the residual coefficient of each RB.

For example, the video encoder can directly encode the coefficients within the RB.

For another example, the video encoder can also perform transformation, such as DCT, DST, Hadamard transform, etc., on the RB, and then encode the transformed coefficient.

As a possible example, when the RB is small, the video encoder can directly quantize uniformly all the coefficients in the RB and then perform a binary encoding. If RB is large, it can be further divided into multiple coefficient groups (CGs), and then all of the CGs are quantized uniformly, and then performed a binary encoding. In some embodiments of the present application, the coefficient group (CG) and the quantization group (QG) may have a same size.

Coding a residual coefficient in a method of semi-fixed length encoding is exemplarily described below. Firstly, the maximum number of the absolute value of residual in an RB is defined as a modified maximum (mm). Secondly, the number of bits for encoding a residual coefficient within the RB is determined according to the above mm (the number of bits for encoding the residual coefficients within the same RB are consistent). For example, if the code length (CL) of the current RB is 2 and the current residual coefficient is 1, then 2 bits are required to encode the residual coefficient 1, which is represented by 01. In a special case, if the CL of the current RB is 7, it means that an 8-bit residual coefficient and a 1-bit sign bit are encoded. Wherein, the CL is determined by finding the minimum M value that satisfies that all residuals of the current RB are within a range of $[-2^{\wedge}(M-1),$ $2^{\wedge}(M-1)]$, and taking the found M as the CL of the current RB. If both boundary values of $-2^{\wedge}(M-1)$ and $2^{\wedge}(M-1)$ exist within the current RB, M should be increased by 1, that is, M+1 bits are required to encode all residuals of the current RB; if only one of the two boundary values $-2^{\wedge}(M-1)$ and $2^{\wedge}(M-1)$ exists within the current RB, it is necessary to encode a Trailing bit to determine whether the boundary value is $-2^{\wedge}(M-1)$ or $2^{\wedge}(M-1)$; and if none of $-2^{\wedge}(M-1)$ and $2^{\wedge}(M-1)$ exist in all of the residuals of the current RB, there is no need to encode the Trailing bit.

In addition, for some special cases, the video encoder can also directly encode the original value of the image instead of the residual value.

Figure 5:
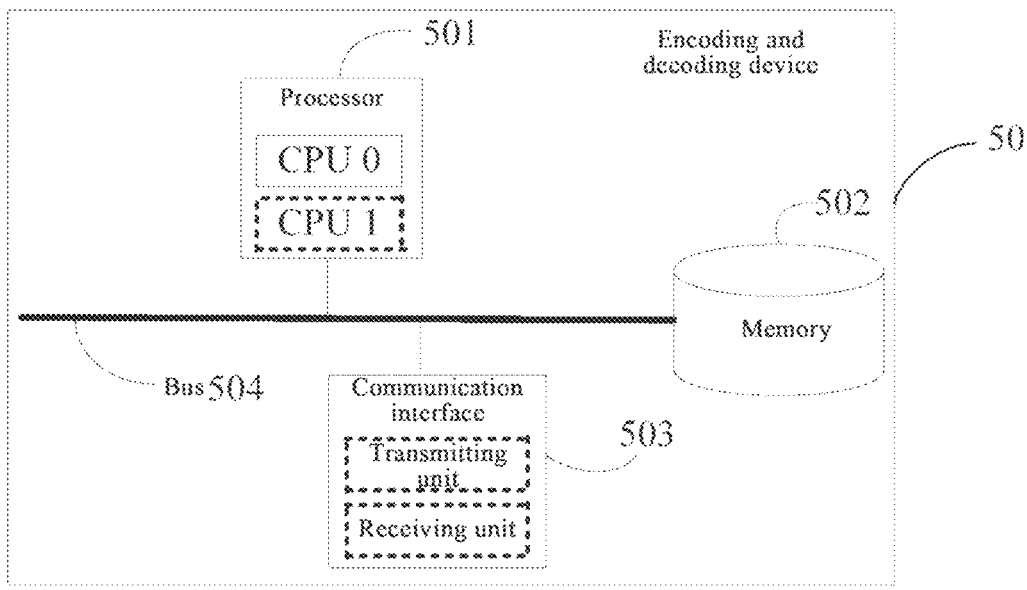
FIG. 5 is a schematic diagram of a structure of a video en/decoding device provided by an embodiment of the present application.

The above video encoder 102 and video decoder 112 can also be implemented in another form, for example, by using a general digital processor system. FIG. 5 provides a schematic diagram of a structure of a video encoding and decoding device, such as the encoding and decoding device 50 shown in FIG. 5, which can be a part of the video encoder 102 or a part of the video decoder 112.

The encoding and decoding device 50 can be applied to an encoding side or a decoding side. The encoding and decoding device 50 includes a processor 501 and a memory 502.

The processor 501 is connected to a memory 502 (e.g., connected to each other via a bus 504). Optionally, the encoding and decoding device 50 may further include a communication interface 503, which is connected to the processor 501 and the memory 502 for receiving/transmitting data.

The memory 502 may be a Random Access Memory (RAM), a Read-Only Memory (ROM), an Erasable Programmable Read-Only Memory (EPROM) or a Compact Disc Read-Only Memory (CD-ROM). The memory 502 is used for storing relevant program codes and video data.

The processor 501 may be one or more Central Processing Units (CPU), such as CPU 0 and CPU 1 shown in FIG. 5. In the case where the processor 501 is one CPU, the CPU may be a single-core CPU or a multi-core CPU.

The processor 501 is used for reading program codes stored in the memory 502 and executing operations of any one of the embodiments corresponding to FIG. 6 and various feasible implementations thereof.

The en/decoding method provided in the present application can be applied to the video encoder 102 or the video decoder 112. For example, in one case, the video encoder 102 may not use the en/decoding method of the present application for encoding, and does not transmit the quantization parameter information to the video decoder 112. In this case, the video decoder 112 may use the en/decoding method provided by the present application for decoding. In another case, the video encoder 102 can use the en/decoding method of the present application for encoding and transmits the quantization parameter information to the video decoder 112. In this case, the video decoder 112 can obtain the quantization parameter information from the code stream for decoding.

Hereinafter, the en/decoding method provided by the present application will be described in detail in combination with the video encoding and decoding system shown in FIG. 1, the video encoder 102 shown in FIG. 2 and the video decoder 112 shown in FIG. 3.

As shown in FIG. 6, it is a flowchart of a video en/decoding method provided by the present application. The method includes:

S601: acquiring, by a video codec, complexity information of a current block in an image to be processed, wherein the complexity information of the current block is used to characterize a degree of difference of pixel values of the current block, and the complexity information of the current block is obtained by calculating at least one angle gradient of the current block at least according to the pixel values of the current block.

It can be understood that information of an image block is usually represented by pixel points contained in the image block. When the difference in pixel value of pixel points in a certain image block is small, that is, the complexity is low, indicating that the color variation of the image block is small, the image block is considered to be relatively simple. Similarly, when the difference in pixel value of pixel points in a certain image block is large, that is, the complexity is high, indicating that the color variation of the image block is large, then the image block is considered to be relatively complex.

Specifically, the complexity information (block_complexity) of the current block is obtained by calculating at least one angle gradient of the current block at least according to the pixel values of the current block. Wherein, the angle gradient of the current block refers to the difference in pixel value of the current block calculated based on a gradient direction of a certain angle. Angle gradient includes horizontal gradient, vertical gradient and other angle gradient.

The horizontal gradient of the current block refers to a set of difference values between pixel values in column t and pixel values in column t-1 of the current block calculated based on the horizontal leftward or rightward gradient direction. Where t is an integer greater than 1. The formula is as follows:

$$\text{horizontal gradient } H = \text{a pixel value in column } t - \text{a pixel value in column } t-1;$$

FIG. 7 provides a schematic diagram of calculating the angle gradient. As shown in Fig. (a) in FIG. 7, taking a 4×2 image block as an example, calculations can be performed on the image block by the above formula in the direction shown in the diagram, to obtain 3×2 difference values, and a horizontal gradient of the image block is a set of the above 3×2 difference values.

Based on the above horizontal gradient, the horizontal complexity is calculated by the following formula, and the horizontal complexity is characterized as complexity_hor below:

$$\text{complexity\_hor} = \text{sum of elements in horizontal gradient } (\text{grad}H)/\text{number of elements } (\text{grad\_block\_size});$$

Combined with the above example, when 3×2 differences are obtained, the complexity_hor of the current block=the sum of six difference values/6. Wherein, elements in the horizontal gradient can be the respective horizontal gradients of the image block calculated in the horizontal direction.

Similarly, the vertical gradient of the current block refers to a set of difference value between pixel values in the row s and pixel values in row s-1 of the current block calculated based on the vertical upward or downward gradient direction. Where s is an integer greater than 1. The formula is as follows:

$$\text{vertical gradient } V = \text{a pixel value in column } s - \text{a pixel value in column } s-1;$$

As shown in Fig. (b) in FIG. 7, taking a 4×2 image block as an example, calculations can be performed on the image block by the above formula in the direction shown in the diagram, to obtain 4×1 difference values, and a horizontal gradient of the image block is a set of the above 4×1 difference values.

Based on the above vertical gradient, the vertical complexity is calculated by the following formula, and the vertical complexity is characterized as complexity_ver below:

$$\text{complexity\_ver} = \text{sum of elements in vertical gradient } (\text{grad}V)/\text{number of elements } (\text{Grad\_block\_size});$$

Combined with the above example, complexity_ver=the sum of four difference values/4. Wherein, elements in the vertical gradient can be respective vertical gradients of the image block calculated in the vertical direction.

Figure 8:
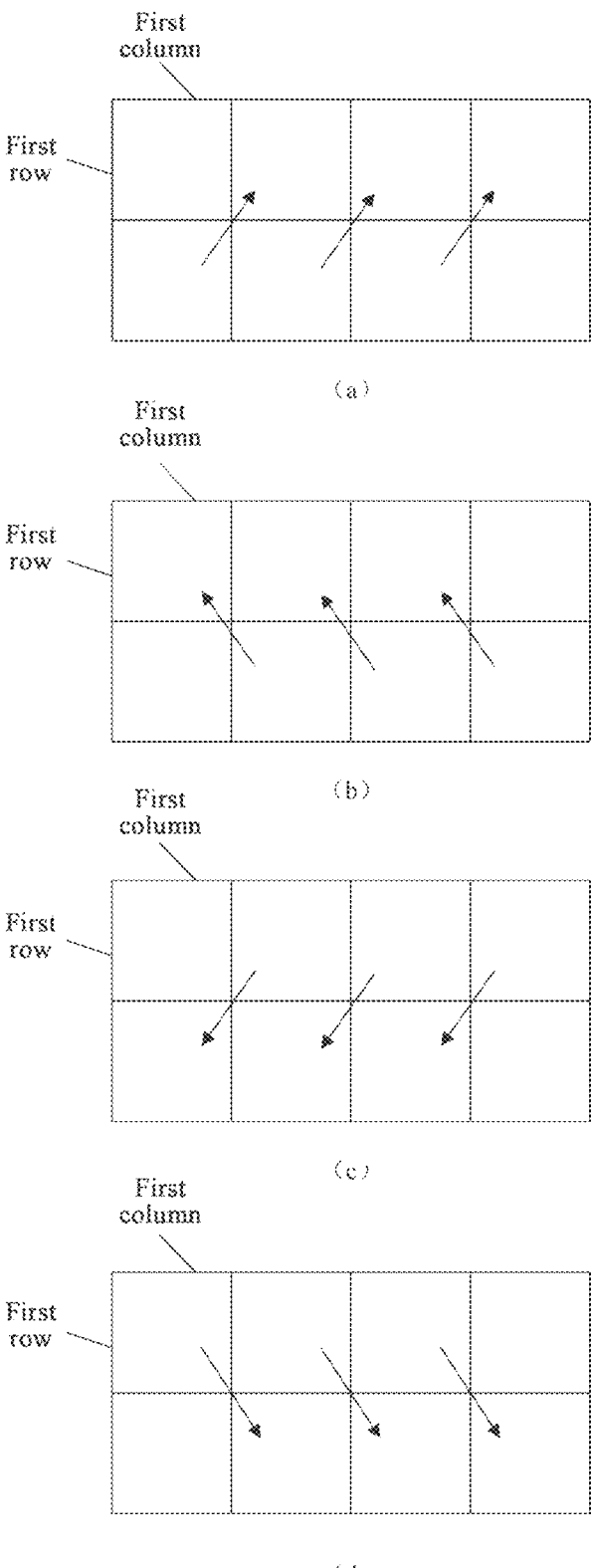
FIG. 8 is a schematic diagram of another manner of calculating the angle gradient provided by an embodiment of the present application.

Similarly, other angle gradients of the current block may include a 45-degree gradient, a 135-degree gradient, a 225-degree gradient or a 315-degree gradient. Referring to a schematic diagram of another manner of calculating the angle gradient provided in FIG. 8, the directions of the above other angle gradients are shown in Figs. (a)-(d) in FIG. 8, respectively.

In the above way, calculating the complexity information of the current block based on the pixel values of the current block contributes to determining a more accurate en/decoding parameter, such as quantization parameter, for the current block, thereby improving the image quality of video en/decoding, and improving the en/decoding efficiency of the image.

The implementation of determining the complexity information of the current block is described below by means of the following first possible implementation to the fourth possible implementation.

In the above solution, the number of elements contained in the gradient of the current block is smaller than the number of pixels of the current block. Considering a more accurate calculation method of the complexity of the current block, the video codec can also determine the complexity information of the current block with reference to reconstructed values of the en/decoded pixel values of the current block.

Figure 9:
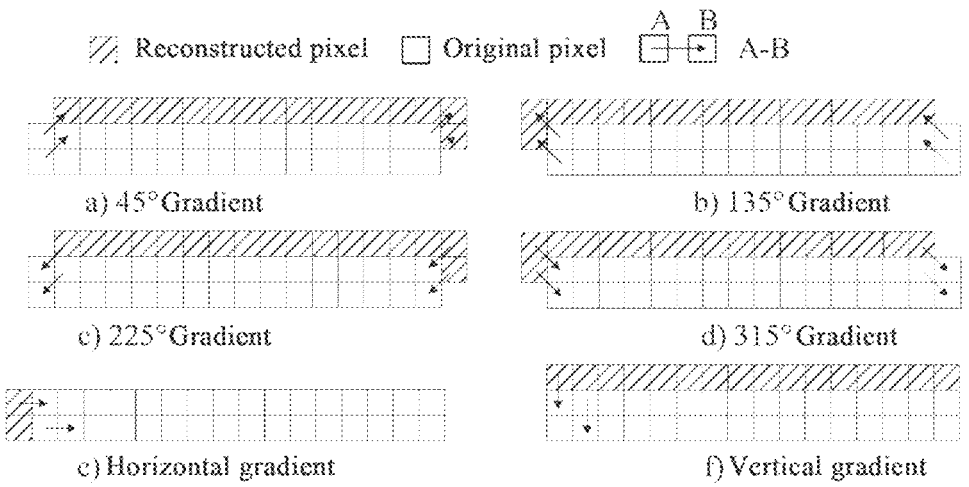
FIG. 9 is a schematic diagram of yet another manner of calculating the angle gradient provided by an embodiment of the present application.

In a first possible implementation, the video codec calculates at least one angle gradient of the current block based on the pixel values of the current block and the reconstructed values of the en/decoded pixel values of the current block; and acquires the complexity information of the current block according to the at least one angle gradient of the current block. Referring to a schematic diagram of yet another manner of calculating the angle gradient provided by FIG. 9, as shown in Figs. a) to f) in FIG. 9, a blank portion represents an original pixel, i.e., a pixel value of the current block; a shaded portion represents a reconstructed pixel, i.e., a reconstructed value of an en/decoded pixel value of the current block. Fig. a) in FIG. 9 is a schematic diagram of calculating the gradient of the current block row by row based on the pixels in the current block and the reconstructed values of the edge pixel values in the gradient direction of the pixel. Thus, according to the above method, for each original pixel, a reconstructed value of a corresponding edge pixel value or other original pixel value in the current block can be found along the gradient direction of the current block to calculate an element contained in the current block in the gradient direction. For example, shaded pixels in the first row are labeled in left-to-right order as pixel 1-1, pixel 1-2 . . . pixel 1-16; pixels in the second row are labeled in left-to-right order as pixel 2-1, pixel 2-2 . . . pixel 2-17; pixels in the third row are labeled in left-to-right order as pixel 3-1, pixel 3-2 . . . pixel 3-16. Then, the calculated gradient of the current block can include: gradient obtained by pixel 2-1 minus pixel 1-1, gradient obtained by pixel 2-2 minus pixel 1-2 . . . gradient obtained by pixel 2-16 minus pixel 1-16, gradient obtained by pixel 3-1 minus pixel 2-2, gradient obtained by pixel 3-2 minus pixel 2-3 . . . gradient obtained by pixel 3-16 minus pixel 2-17. In this way, for 2×16 original pixels, 32 gradient values can be obtained. Similarly, the calculation method of the angle gradient in the gradient direction shown in Figs. b)-f) in FIG. 9 can be referred to the method of calculating the gradient shown in Fig. a) in FIG. 9, and the difference therebetween is the differences in the position and angle direction of the pixel used, which will not be described in detail here.

An implementation of acquiring complexity information of a current block according to at least one angle gradient of the current block can refer to the following embodiments, which will not be described in detail here.

In this way, for one original pixel, one element can be obtained by performing a calculation in the same gradient direction, and the number of elements contained in each gradient of the current block is equal to the number of pixels of the current block.

The above elements can characterize the change of pixels in the current block corresponding to the element along the gradient direction, and the elements correspond to the pixels in the current block one by one, so all of the elements can uniformly characterize the changes of pixels in the current block along the gradient direction, so the elements obtained based on the above can be helpful to acquire more accurate complexity information of the current block.

In a second possible implementation, the video codec calculates the complexity information of the current block based on the pixel values of the current block and the pixel values adjacent to the current block in the image to be processed. The difference from the above-mentioned first possible implementation is that: it is the reconstructed values of the en/decoded pixel values of the current block that used i.e., the reconstructed values are used and the reconstructed values are the reconstructed values of the pixels within the current block, in the first possible implementation. However, in this possible implementation, what used are the pixel values adjacent to the current block in the image to be processed, that is, values related to the pixels in the block adjacent to the current block, which can be reconstructed values or original values.

It can be understood that it is similar to the above method of calculating the complexity information based on the reconstructed values of the en/decoded pixel values of the current block. Still as shown in FIG. 9, wherein the blank portion in FIG. 9 can be regarded as 16×2 pixels of the current block, but the difference is that the shaded portion in FIG. 9 can be regarded as the pixels adjacent to the current block, indicating the pixel values adjacent to the pixel values of the current block.

For example, when the horizontal gradient calculation is performed for Fig. e) in FIG. 9, the current block includes 16×2 pixels at this time. By means of the reconstructed values of pixels in a previous column of the current block minus the pixel values of pixels in the first column of the current block, the reconstructed values of the pixels in the first column of the current block minus the pixel values of pixels in the second column of the current block . . . and the reconstructed values of pixels in the fifteenth column of the current block minus the pixel values of pixels in the sixteenth column of the current block, in this way, the horizontal gradient that can be calculated includes 16×2 difference values, and complexity_hor of the current block=a sum of 32 difference values/32. The specific calculation method is not described in detail here.

It should be noted that the above optional methods are only examples. In fact, a plurality of reconstructed pixels and adjacent pixels can be selected. For example, a reconstructed pixel is an average value of the first n rows or the first n columns or the first n reconstructed values of the current block, and an adjacent pixel is an average value of the first n rows or the first n columns or the first n pixel values of the current block, which is not limited in the present application.

Optionally, the complexity information of the current block is obtained according to at least one angle gradient of the current block. Specifically, the video codec takes the minimum value in the complexity information obtained according to the at least one angle gradient as the complexity information of the current block. That is, if the complexity information of the current block calculated based on a certain angle gradient is minimum, the minimum complexity information is taken as the complexity information of the current block.

In a third possible implementation, during the video en/decoding process, the image to be processed is sampled in multiple channels, and therefore, the current block is composed of multiple channel image blocks. When the current block is an N-channel image block, where N is an integer greater than zero, the video codec can determine the complexity information of each channel image block based on the pixel values of each channel image block in the above-mentioned N-channel image block, and determine the complexity information of the current block based on the complexity information of each channel image block. For example, the minimum value in the complexity information of the N-channel image block is determined as the complexity information of the current block. In this way, the complexity information calculated for the image block of a single channel image is more accurate, which helps to improve the accuracy of determining the complexity information of the current block and the accuracy of video en/decoding.

In a possible implementation, for each channel image block, at least one angle gradient can be calculated, and a piece of complexity information of the channel image block can be obtained based on each angle gradient, and then the complexity information of the channel image block is determined based on the obtained complexity information, for example, the minimum value in the obtained complexity information is determined as the complexity information of the channel image block.

In another possible implementation, the video codec divides each channel image block of the multiple channel image blocks constituting the current block, and determines the complexity information of each channel image block based on the sub-blocks obtained after dividing each channel image block. Specifically, the video codec divides each channel image block into at least two sub-blocks, acquires the complexity information of at least two sub-blocks of each channel image block, and determines the complexity information of the respective channel image block in each channel image block based on the complexity information of at least two sub-blocks of each channel image block.

Figure 10:
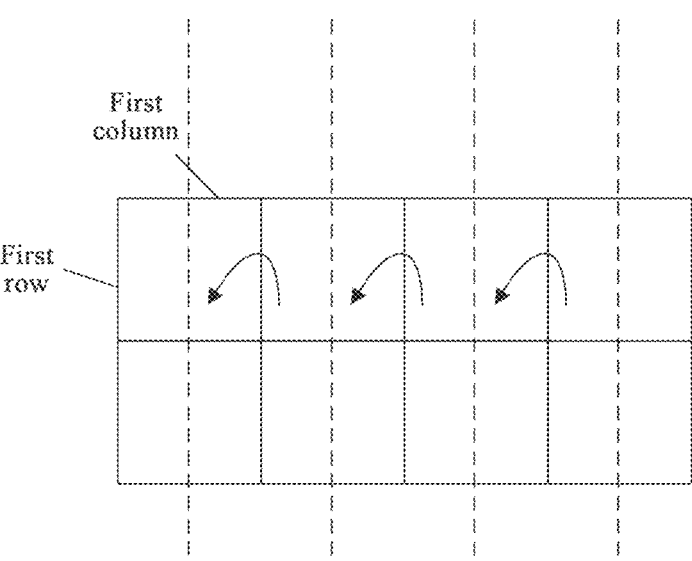
FIG. 10 is a schematic diagram of dividing an image block and calculating an angle gradient provided by an embodiment of the present application.

Exemplarily, as shown in the schematic diagram of dividing an image block and calculating an angle gradient provided in FIG. 10, certain 4×2 channel image blocks of the current block are divided in the vertical direction, and then angle gradient is calculated for 8×2 sub-image blocks obtained by the division to acquire the complexity information of the channel image block.

Wherein, the implementation of determining the complexity information of at least two sub-blocks of each channel image block can refer to the implementation provided in FIG. 7 above and will not be described in detail here.

Optionally, the video codec determines the minimum value of the complexity information of at least two sub-blocks of each channel image block as the complexity information of the respective channel image block.

It should be noted that division rules of channel image blocks for the above sub-blocks may be the same or different. Wherein, the sampling format of the image may result in the sizes of channel image blocks being different. For example, when YUV format is used to sample based on 420 sampling format as described above, the block sizes after luminance sampling, first chrominance sampling and second chrominance sampling are different. Therefore, a relatively large channel image block can be partitioned before determining the complexity information of this channel image block, so that the complexity information calculated for the smaller sub-block in the channel image block is more accurate, so the complexity information of the channel image block obtained based on the complexity information of the sub-block is more accurate, which helps to improve the accuracy of determining the complexity information of the current block and improving the accuracy of video en/decoding.

The multi-channel in the present application is not limited to the aforementioned three channels of RGB, but there may be more channels. For example, when the image sensor is a four-channel sensor, a corresponding image to be processed includes image information of four channels. For example, when the image sensor is a five-channel sensor, a corresponding image to be processed includes image information of five channels.

The multiple channels in the present application can include at least one or more of the following channels: a Y channel, a U channel, a V channel, a Co channel, a Cg channel, an R channel, a G channel, a B channel, an alpha channel, an IR channel, a D channel and a W channel. For example, multiple channels include a Y channel, a U channel and a V channel; or multiple channels include a R channel, a G channel and a B channel; or multiple channels include an R channel, a G channel, a B channel and an alpha channel; or multiple channels include an R channel, a G channel, a B channel and an IR channel; or multiple channels include an R channel, a G channel, a B channel and a W channel. The multiple channels include an R channel, a G channel, a B channel, an IR channel and a W channel; or multiple channels include an R channel, a G channel, a B channel and a D channel; or multiple channels can include an R channel, a G channel, a B channel, a D channel and a W channel. Wherein, in addition to RGB color photosensitive channels, there may also be an IR channel (an infrared or near-infrared photosensitive channel), a D channel (a dark light channel, mainly through infrared or near-infrared light) and a W channel (a panchromatic photosensitive channels). There are different channels for different sensors, for example, the sensor types can be RGB sensors, RGBIR sensors, RGBW sensors, RGBIRW sensors, RGBD sensors, RGBDW sensors, etc.

In a fourth possible implementation, the video codec acquires a prediction angle adopted by the angle prediction mode of the current block, calculates an angle gradient based on the prediction angle to acquire corresponding complexity information, and takes the corresponding complexity information as the complexity information of the current block.

The angle prediction mode is a common prediction mode, which is used to determine a residual between a reconstructed value and a pixel value of the current block according to a specified angle. The prediction angle can also be referred to as a prediction direction, which is similar to the angle involved in other angle gradients mentioned above, such as 45°, 135°, etc.

The implementations of calculating the angle gradient based on the prediction angle and obtaining the corresponding complexity information can refer to the implementations described above, and will not be described here.

By means of the above method, a correlation relationship is established between the prediction mode of the current block and the calculation of complexity information, so that the calculation of complexity information of the current block is more well-directed, the accuracy of complexity information is improved, and the accuracy of video en/decoding is improved.

Optionally, the prediction mode also involves multiple prediction modes such as a mean (DC) prediction mode and a Planar prediction mode. Multiple complexity information for the current block can be set by the video codec to determine the complexity information of the current block according to the prediction mode. In one case, the multiple complexity information can be calculated according to the above multiple angle gradients, and in another case, the multiple complexity information can be preset in the video codec. Wherein, the preset multiple complexity information has a correspondence with the prediction modes respectively, for example, the multiple complexity information includes first complexity information and second complexity information, the first complexity information corresponds to an angle prediction mode (which may include one or more angle prediction modes), and the second complexity information corresponds to a DC prediction mode and a Planar prediction mode. When performing a prediction on the current block, multiple prediction results may be obtained based on multiple prediction modes, and an optimal prediction mode is determined as the prediction mode of the current block based on the Rate-Distortion Optimization (RDO) cost. The complexity information of the current block can be acquired according to a correspondence between the prediction mode determined based on the RDO cost and the preset complexity information. Combined with the above example, if the prediction mode of the current block is determined to be a DC prediction mode based on the RDO cost, the complexity information of the current block should be the second complexity information according to the above correspondence.

Optionally, the above prediction modes are classified into multiple categories, wherein each category can correspond to one piece of complexity information respectively. The multiple categories include an intra-frame mode category, a point prediction mode category, a Screen Content encoding (SCC) mode category, an original value mode category and a fallback mode category. For example, the angle prediction mode belongs to the intra-frame mode category. In addition, the categories to which the above prediction modes belong can be further classified according to whether the transformation is performed. For example, the intra-frame mode category can be classified into intra-frame mode+transformation category and intra-frame mode+no-transformation category. A correspondence between the complexity information and the category is similar to the above first complexity information corresponding to one or more prediction modes. When the category to which the prediction mode of the current block belongs is determined, corresponding complexity information is used to calculate the quantization parameter.

Optionally, it can be seen from the above third possible implementation that the video codec determining the complexity information of the current block according to at least one angle gradient of the N channel image blocks of the current block is realized by the following steps S11-S12.

S11, acquiring, by the video codec, the complexity information of each channel image block based on the pixel values of each channel image block in the N-channel image block; wherein N is an integer greater than zero.

S12. determining, by the video codec, the complexity information of the current block based on the complexity information of the each channel image block.

As can be seen from the preceding description, for the current block, at least one angle gradient can be obtained, so as to obtain the complexity information of the current block according to the obtained angle gradient; for the channel image block, at least one angle gradient can be obtained, so as to obtain the complexity information of the channel image block according to the obtained angle gradient; for the sub-block of the channel image block, at least one angle gradient can also be obtained, so as to obtain the complexity information of the sub-block according to the obtained angle gradient. In addition to the implementation of obtaining complexity information described above, there are other implementations. Taking obtaining the complexity information of the current block as an example, it will be explained through the following implementations 1-4.

Implementation 1, the minimum value in all pieces of the complexity information calculated based on the angle gradients is taken as the complexity information of the current block. The expression is as follows:

$$\text{block\_complexity} = \min(\text{complexity\_ver}, \text{complexity\_hor}, \text{complexity\_45}, \text{complexity\_135}, \text{complexity\_225}, \text{complexity\_315})$$

Wherein, complexity_45 is complexity information calculated based on 45° angle gradient, complexity_225 is complexity information calculated based on 225° angle gradient, complexity_135 is complexity information calculated based on 135° angle gradient, and complexity_315 is complexity information calculated based on 315° angle gradient.

Implementation 2, the complexity information of the current block is obtained according to weighted values of all pieces of the complexity information calculated based on the angle gradients. The expression is as follows:

$$\text{block\_complexity} = \text{complexity\_ver} \times w_v + \text{complexity\_hor} \times w_h + \text{complexity\_225} \times w_{225} + \text{complexity\_315} \times w_{315}$$

Wherein, $w_v$ represents a weighted value corresponding to the vertical gradient, $w_h$ represents a weighted value corresponding to the horizontal gradient, $w_{225}$ represents a weighted value corresponding to 225° gradient, $w_{315}$ represents a weighted value corresponding to 315° gradient, $0 \leq w_v, w_h, w_{225}, w_{315} \leq 1$ and $w_v + w_h + w_{225} + w_{315} = 1$.

Implementation 3, the complexity level (complexity_level) of the each original channel image block is calculated, and the block_complexity of the current block is determined based on the complexity_levels of all of the channel image blocks, which includes the following steps S21-S23.

Step S21: determining, by the video codec, the complexity_level of each channel image block according to the complexity information (complexity) of each channel image block.

Case 1: Considering the subjective model of human eyes, A-1 absolute thresholds are set for leveling to classify the image blocks into A levels from simple to complex.

For example, for an 8-bit image block with a sampling format of YUV444, the complexity_levels of all of the channel image blocks are classified according to the following methods, including that: complexity$\leq$4 belongs to level 1, 4<complexity<16 belongs to level 2, and complexity$\geq$16 belongs to level 3. For another embodiment, for a 10-bit image block with a sampling format of YUV444, the complexity_levels of all of the channel image blocks are classified according to the following methods, including that: complexity$\leq$8 belongs to level 1, 8<complexity<64 belongs to level 2, and complexity$\geq$64 belongs to level 3. For yet another embodiment, for a 12-bit image block with a sampling format YUV444, the complexity_levels of all of the channel image blocks are classified according to the following methods, including: complexity$\leq$16 belongs to level 1, 16<complexity<256 belongs to level 2, and complexity$\geq$256 belongs to level 3.

Case 2: Considering the subjective model of human eyes, B-1 absolute thresholds are set for leveling, and then C dynamic thresholds updated with the image blocks are set, to classify the image blocks into B+C levels.

Figure 11:
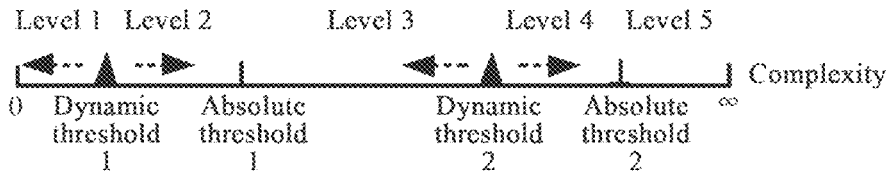
FIG. 11 is a schematic diagram of a relationship between a dynamic threshold and an absolute threshold provided by an embodiment of the present application.

As shown in FIG. 11, it is a schematic diagram of a relationship between a dynamic threshold and an absolute threshold provided by an embodiment of the present application. Wherein, the absolute threshold 1 is 4 and the absolute threshold 2 is 16, then $0<$dynamic threshold (thread) $1<4$, $4<$thread$2<16$. Assume that complexity≤thread1 belongs to level 1, thread1$<$complexity≤4 belongs to level 2, $4<$complexity≤thread2 belongs to level 3, thread2$<$complexity≤16 belongs to level 4, and complexity$>16$ belongs to level 5. Wherein, the dynamic threshold is updated with the image blocks, and if the complexity information of the current block is less than the weighted complexity information of several previous image blocks, the dynamic threshold becomes smaller; if the complexity information of the current block is equal to the weighted complexity information of several previous image blocks, the dynamic threshold is unchanged; if the complexity information of the current block is greater than the weighted complexity information of several previous image blocks, the dynamic threshold becomes larger.

Step S22: determining, by the video codec, the complexity level of the current block (block_complexity_level) based on the complexity_levels of all of the channel image blocks.

For the complexity level of each channel image block, the channel to which human eyes is sensitive can be assigned with a greater weight; otherwise, a smaller weight can be assigned, and the complexity level of each channel image block is weighted to obtain the complexity level of the current block.

Taking the number of channels of an image block being 3 as an example, the complexity level of the current block can be determined by the following expression:

$$\text{block\_complexity\_level}=\text{complexity\_level}1\times w1+$$
$$\text{complexity\_level}2\times w2+\text{complexity\_level}3\times w3$$

Wherein, w1, w2 or w3 can be 0, w1, w2 and w3 respectively represent the weights of the complexity levels of the three channel image blocks, and complexity_level1, complexity_level2 and complexity_level3 respectively represent the complexity levels of the three channel image blocks. For example, for an image block with a sampling format of YUV444, the Y-channel coefficient can be given a greater weight, and then w1=2 and w2=w3=1 can be set.

Step S23: representing, by the video codec, the complexity information of the current block based on block_complexity_level.

Through steps S21-S23, the weights of the complexity levels of image blocks of different channels can be flexibly adjusted, so as to flexibly adjust the complexity information of the current block.

For implementation 3, the video codec may also directly determine the complexity information of the current block (block_complexity) according to the complexities of all of the channel image blocks without performing the above step S21, that is, the following implementation 4.

In implementation 4, weighting directly, by the video codec, the complexities of all of the channel image blocks to obtain the complexity information of the current block. The expression is as follows:

$$\text{block\_complexity}=\text{complexity}1\times w4+\text{complexity}2\times$$
$$w5+\text{complexity}3\times w6$$

Wherein, w4, w5 or w6 can be 0, w4, w5 and w6 respectively represent the weights of the complexity information of the three channel image blocks, and complexity1, complexity2 and complexity3 respectively represent the complexity information of the three channel images. The weights represented by w4, w5 and w6 can be related to the subjective model of human eyes, for example, a channel to which human eyes is sensitive can be assigned with a greater weight.

In addition, the block_complexity_level can be obtained by leveling the block_complexity by adapting the above step S22 based on the obtained block_complexity.

It should be noted that if the N-channel image block is divided into at least two sub-blocks, the video codec can still determine the complexity information of the N-channel image block by adapting the above method, and then determine the complexity information of the current block.

Specifically, taking a channel image block divided into two sub-blocks as an example, the complexity information of the two sub-blocks is sub_complexity1 and sub_complexity2 respectively, when determining the complexity information (complexity1) of the channel image block based on the complexity information of the two sub-blocks, the following implementations 5-7 are included.

Implementation 5, the minimum value in the complexity information of all of the sub-blocks is taken as the complexity information of the channel image block.

$$\text{complexity}=\min(\text{sub\_complexity}1,\text{sub\_complexity}2)$$

Implementation 6, the complexity information of all of the sub-blocks are weighted to obtain the complexity information of the channel image block.

$$\text{complexity}=\text{sub\_complexity}1\times w7+\text{sub\_complexity}2\times$$
$$w8,$$

where w7 and w8 respectively represent the weights of the complexity information of two sub-blocks, and $0\le w7\le 1$ and $0\le w8\le 1$.

Implementation 7, the complexity information of the channel image block is determined based on the complexity levels of all of the sub-blocks.

The following (1) and (2) take the complexity levels of two sub-blocks as sub_complexity_level1 and sub_complexity_level2, the complexity information of the channel image block as complexity1, and the complexity level of the channel image block as complexity_level1 as an example, and illustrate the implementation. Wherein, the method for determining the complexity level of each sub-block can be as follows: determining the complexity level of each sub-block according to the complexity information of each sub-block. Specifically, the description of step S21 above can be referred, with a difference that the names of each sub-block and each channel image block are different, which will not be described in detail here.

(1) The complexity level of the channel image block can be determined based on the complexity levels of all of the sub-blocks.

Optionally, the complexity levels of all of the sub-blocks (such as sub_complexity_level1 and sub_complexity_level2) can be weighted to obtain the complexity level of the channel image block (such as complexity_level 1). The expression is as follows:

$$\text{complexity\_level }1=\text{sub\_complexity\_level }1\times w9+$$
$$\text{sub\_complexity\_level }2\times w10,$$

wherein w9 and w10 respectively represent the weights of the complexity levels of the two sub-blocks, and $0\le w9\le 1$ and $0\le w10\le 1$.

Optionally, the minimum value in the complexity levels of all of the sub-blocks (such as sub_complexity_level1 and sub_complexity_level2) is taken as the complexity_level of the channel image block (such as complexity_level 1). The expression is as follows:

$$complexity\_level\ 1 = min(sub\_complexity\_level\ 1, sub\_complexity\_level\ 2)$$

(2) The complexity information of the channel image block is represented based on the determined block complexity level of the channel image block.

Specifically, this step is similar to S23 and will not be described in detail here.

Another implementation of step S601 will be described below.

In one case, the video encoder 102 can acquire complexity information and transmit it to the video decoder 112. Then, in this case, when the codec is the video decoder 112, the optional implementation of the above step S601 includes: parsing the code stream and acquiring the complexity information of the current block in the image to be processed from the code stream.

S602: determining, by the video codec, the quantization parameter of the current block according to the complexity information of the current block.

Optionally, determining, by the video codec, the quantization parameter of the current block according to the complexity information includes the following steps S31-S32.

S31: determining, by the video codec, the reference quantization parameter (ref_qp) of the current block according to the complexity information of the current block.

S32: determining the quantization parameter of the current block according to the reference quantization parameter of the current block.

The reference quantization parameter is used to guide the generation of quantization parameter.

Optionally, the video codec acquires a buffer status of the image to be processed and a correspondence between the buffer status and the complexity information of the current block, and determines the reference quantization parameter of the current block according to the correspondence between the buffer status and the complexity information.

In the video encoding process, due to the different encoding rates of different image blocks, the output code stream fluctuates and affects the transmission stability. In this regard, the video encoder also includes a buffer module, and a buffer in the buffer module is used to control the code stream to be output at a uniform speed. It can be understood that the code stream being output at the uniform speed refers to the outputting, at the uniform speed, of the bits occupied by the code stream, which means that the buffer enables the encoded code stream which flows in at a non-uniform speed to flow out at a uniform speed to a realize stable output. In addition, the buffer is not allowed to overrun, wherein overrun includes overflow and underflow, in which exceeding the maximum value (max_buffer) of the buffer status is overflow, and being lower than the minimum value (0) of buffer status is underflow.

The above buffer status is used to characterize the number of bits occupied in the buffer for the image block that has been encoded in the image to be processed. It can be understood that the buffer status is updated with the image block. For example, a certain encoded image block flows into the buffer at a speed of 100 bit per second, and the preset buffer flows out at a uniform speed of 50 bits per second, then the number of bits in the buffer of the image block at this second should be 100−50=50 bits.

The above buffer status can also be referred to as physical buffer status (physical_buffer).

Specifically, the video codec can directly read the status information of the corresponding buffer to acquire the buffer status of the image to be processed. The correspondence between the buffer status of the image to be processed acquired by the video codec and the complexity information of the current block can be realized through the following steps S41-S42.

S41: determining, by the video codec, a fullness according to the buffer status.

The fullness refers to a piecewise linear mapping of the buffer status, which indicates a filling degree of the buffer. Refer to the following formula:

$$fullness = physical\_buffer \times a + b;$$

Wherein a and b are piecewise linear mapping parameters of fullness based on physical_buffer, a represents a scaling ratio for physical_buffer, and b represents an offset degree for physical_buffer. These parameters can be adjusted according to the buffer status, image information and complexity information. The following is an explanation of each case.

Case 1: parameters a and b are determined according to image information.

For example, in several blocks at the beginning of slice, a=0.8, b=(−bpp)/(2×block_size). Where block_size represents the size of the block.

It can be understood that in the several blocks at the beginning of slice, the buffer status is small, so the fullness can be further reduced by means of the above a and b to acquire a smaller ref_qp and improve the accuracy of en/decoding.

Alternatively, in blocks at the boundary of slice (such as the first row and the first column), a=0 and b=−bpp× block_size.

It is understandable that the blocks at the boundary have no reference pixels, and the quality of the prediction results is poor. The fullness can be reduced by determining a smaller ref_qp.

Case 2: parameters a and b are determined according to the image information and the buffer status.

Parameters a and b are adjusted according to a relationship between bpp and the buffer status.

For example, when bpp is 8 and (physical_buffer)/(max_buffer)>0.85, a=1 and b=0. For another example, when bpp is 6 and (physical_buffer)/(max_buffer)>0.85, a=1.1 and b=block_size.

It can be seen that when the buffer status is full at low bpp, the fullness can be further increased by means of the above A and B to acquire a larger ref_qp, so as to prevent the buffer status from exceeding the maximum number of bits in the buffer.

Case 3: parameters a and b are determined according to the image information and complexity information.

For example, for an image block with higher complexity information, a=1 and b=bpp×block_size; for an image block with ordinary complexity information, a=1 and b=0; for an image block with lower complexity information, a=1 and b=−bpp× block_size.

Optionally, the level of complexity information may correspond to the complexity information level above.

Case 4: parameters a and b are determined according to the buffer status.

For example, when physical_buffer<(max_buffer)/2, a=0.9 and b=0. When (max_buffer)/2≤physical_buffer<(3× max_buffer)/4, a=1.0 and b=0. When physical_buffer≥(3× max_buffer)/4, a=1.2 and b=0.

It can be seen that when the buffer is relatively empty, the fullness can be reduced by means of the above a and b to achieve an effect of reducing ref_qp; similarly, when the buffer status is relatively slow, the fullness can be increased by means of the above a and b to achieve an effect of increasing ref_qp.

It should be noted that the above four cases are only examples for determining the relevant parameters of parameters a and b, where the values of the parameters can be other values, which is not limited.

S42: calculating, by the video codec, ref_qp according to the fullness.

An implementation of determining ref_qp will be described below.

In a possible implementation, ref_qp can be calculated with reference to the following formula:

$$ref\_qp = fullness \times c + d;$$

Where c and d are parameters that can be adjusted according to the buffer status, image information and complexity information. Optionally, the parameter c can be determined based on max_qp, where max_qp is the maximum quantization parameter.

Where c and d are piecewise linear mapping parameters of ref_qp based on fullness, c represents a scaling ratio for fullness, and d represents an offset degree for fullness. These parameters can be adjusted according to image information, complexity information and fullness. The following is an explanation of each case.

Case 1: parameters c and d are determined according to the image information.

For example, fixed parameters, c=1 and d=1, can be used according to the image information. Different c and d can be used for different bit widths.

Alternatively, the blocks at the boundary of slice (such as the first row and the first column) are specially processed to make the ref_qp smaller than the original, that is, smaller c and d are used.

Case 2: parameters c and d are determined according to fullness and the image information.

For example, parameters c and d are determined for the bit width and the target pixel depth (target_bpp) in the image information.

For example, for the case where the target_bpp is 8 bit and fullness<0.1, when it is an 8 bit image, c=0 and d=2; when it is a 10 bit image, c=0 and d=4; when it is a 12 bit image, c=0 and d=6. For the case where target_bpp is 8 bit and fullness>0.8, when it is an 8 bit image, c=1 and d=2; when it is a 10 bit image, c=1 and d=4; when it is a 12 bit image, c=1 and d=6. Wherein, c and d can be updated with the image block.

Wherein, target_bpp refers to a parameter specified by an encoding end, which indicates average number of bits required per pixel point after compression. For example, for a 10 bit original image with a sampling format of YUV444, the bpp of the original image is 30 bit, and if the target_bpp is 5 bits, it means that it is compressed by 6 times.

In another possible implementation, ref_qp can also be determined according to the bit width and pixel depth in the image information. Specifically, a range can be determined for ref_qp based on the image information, wherein when the image information changes, the range of ref_qp to which it corresponds is different. Specifically, the range is an interval from a minimum reference quantization parameter (min_ref_qp) to a maximum reference quantization parameter (max_ref_qp). For example, for an image with a bpp of 8 bit and a sampling format of YUV444, when fullness<0.25, min_ref_qp=0, max_ref_qp=8, and ref_qp is selected from (0,8); when fullness>0.85, min_ref_qp=4, max_ref_qp=56, and ref_qp is selected from (4,56); otherwise, min_ref_qp=0, max_ref_qp=32, and ref_qp is selected from (0,32).

Case 3: parameters c and d are determined according to the buffer status.

Specifically, parameters c and d are determined according to the relationship between physical_buffer and max_buffer.

c=1.0 and d=0 when physical_buffer< (max_buffer)/4, c=0.5, d=0; when (max_buffer)/4≤physical_buffer< (max_buffer)/2; c=1.3 and d=0 when physical_buffer≥ (max_buffer).

Case 4: parameters c and d are determined according to the complexity information and fullness.

For blocks with higher complexity information, the mapping results at different fullness are different. For example, when fullness=0.5, the ref_qp, for complex block, is mapped to 32, and the ref_qp, for simple block, is mapped to 16.

Alternatively, for example, for a simple block, when fullness<0.2, c>0 and d=0, that is, ref_qp increases with the increase of fullness, when 0.2≤fullness≤0.8, c=0, d>0, the value of d will be updated with the image block, so that ref_qp remains constant within a certain fullness with the increase of fullness; when fullness>0.8, c>0, so that ref_qp increases with the increase of fullness; the operations for ordinary blocks and complex blocks are similar. Wherein, a simple block can be understood as a block with complexity information less than or equal to a first preset value, a complex block can be understood as a block with complexity information greater than or equal to a second preset value, and an ordinary block can be understood as a block with complexity information between the first preset value and the second preset value.

Case 5: the parameter c is determined according to the complexity information.

According to the above formula for calculating ref_qp, in the case that parameter c is set to be large, the change degree of ref_qp changing with fullness will increase, and the change degree of qp determined based on ref_qp changing with fullness will also increase. It can be seen that parameter c can be regarded as "slope" in a mapping relationship between qp and fullness. Therefore, the sensitivity of qp changing with fullness can be adjusted by adjusting the value of parameter c. Because when encoding a block with lower complexity, the computational resources such as the number of bits in the buffer consumed by encoding are lower, the sensitivity of qp changing with fullness can be appropriately reduced, that is, the value of parameter c can be appropriately reduced, so that qp will not be adjusted too small due to the change of fullness, that is, the encoding quality of a block with lower complexity will not be too low. On the contrary, when encoding a block with higher complexity, the computational resources such as the number of bits in the buffer consumed by encoding are higher, so the sensitivity of qp changing with fullness can be appropriately improved, that is, the value of parameter c can be appropriately increased, and the control ability of code rate can be further improved. In summary, for a block with higher complexity, a higher parameter c can be determined, and for a block with lower complexity, a lower parameter c can be determined.

For example, for a block with higher complexity, c=1.1; for a block with lower complexity, c=0.9.

Case 6: parameters e and f are determined according to complexity information, maximum complexity (max_complexity) and maximum quantization parameter (max_qp), wherein e and f are parameters related to fullness, buffer status and image information.

$$\text{ref\_}qp = \text{complexity}/\text{max\_complexity} \times \text{max\_}qp \times e + f.$$

Figure 12A:
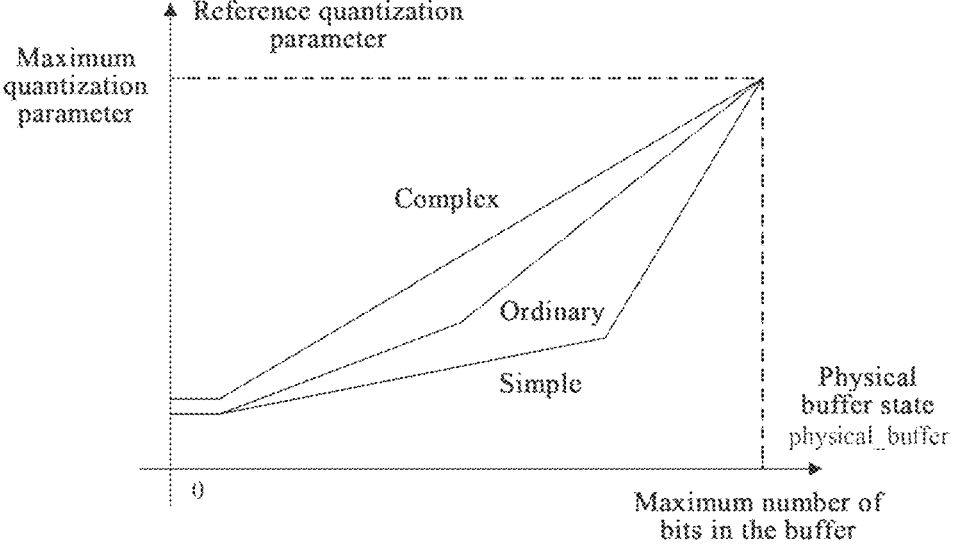
FIG. 12*a* is a graph of functions of a reference quantization parameter, complexity information and a buffer status provided by an embodiment of the present application.

The above-mentioned determining the reference quantization parameter based on complexity information and fullness or buffer status can also refer to a function graph of reference quantization parameter, complexity and buffer status provided in FIG. 12a. Wherein, with the increase of buffer status, the reference quantization parameter increases, and the complexity information can have different effects on the growth of reference quantization parameter according to the buffer status. For example, for the image block with higher complexity, the reference quantization parameter increases with the increase of the buffer status. However, for the image block with lower complexity, the increase of the buffer status can be smaller relative to the increase of the reference quantization parameter of the image block with higher complexity. Of course, the influence of complexity and buffer status on the reference quantization parameter is always positively correlated.

Figure 12B:
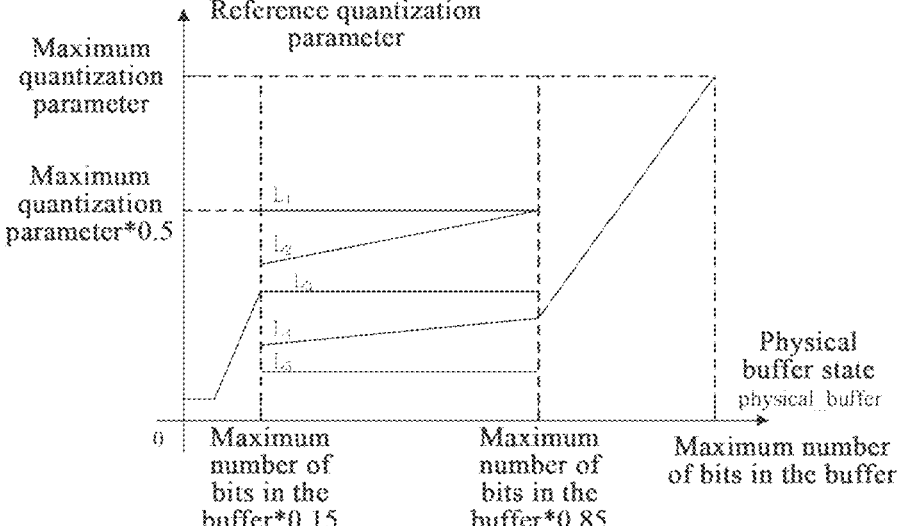
FIG. 12*b* is a graph of functions of a reference quantization parameter and a buffer status provided by an embodiment of the present application.

Specifically, as shown in a function graph of reference quantization parameter and buffer status provided in FIG. 12b, it is assumed that in the intervals of (0, max_buffer× 0.15) and (max_buffer×0.85, the maximum number of bits in buffer], the influence of buffer status on reference quantization parameter is dominant, that is, when the buffer status is relatively empty or relatively full, the influence of complexity is relatively small. However, in the interval of [max_buffer×0.15, max_buffer×0.85], the influence of complexity is relatively large. Further considering the influence of complexity information on the reference quantization parameter, five possibilities may be generated as shown in the figure. When the influence of complexity is relatively small, the reference quantization parameter can remain unchanged at this case in this interval, corresponding to $L_3$; when the influence of complexity is ordinary, the reference quantization parameter can slowly increase at this case in this interval, corresponding to $L_2$ or $L_4$; when the influence of complexity is relatively large, the reference quantization parameter may suddenly change at this case in this interval, corresponding to $L_1$ or $L_5$. Wherein, a starting point based on the change of complexity is determined according to complexity information itself.

The influence of complexity information considered in each interval in FIG. 12b can be referred to a function graph of the reference quantization parameter and the complexity provided in FIG. 12c.

It can be seen that based on the physical buffer status of the image to be processed, the input and output of the code stream in the buffer of the image to be processed can be dynamically controlled, so that the code stream can be output more stably.

Optionally, the video codec determines a complexity level of the current block, determines target bits (target_cost) according to the complexity level of the current block, and acquires a reference quantization parameter of the current block according to the target bits. The target bits refer to the predicted number of bits of the current block after en/decoding. The actual number of bits of the current block after en/decoding may be greater than or less than or equal to the target bits. Wherein, determining a complexity level of the current block can refer to the above embodiment part on complexity level, which is not repeated here. Wherein, the above target bits refer to the number of bits occupied by the current block in the code stream.

Specifically, the video codec determining the target bits according to the complexity level of the current block may be realized through the following cases.

Case 1: the target_cost is determined according to the image information and complexity.

Specifically, each piece of complexity information stores one reference bit number (ref_cost) and is updated with the image block, ref_cost=0.75×ref_cost$_{t-1}$+0.25×real_cost, wherein real_cost represents the number of predicted lossless consumed bits of the current block, which is related to the quantization parameter (qp) and the number of actual encoding bits; ref_cost is the number of reference bits used to determine target_cost, ref_cost$_{t-1}$ is the number of reference bits corresponding to the previous image block, and ref_cost can also be used to characterize the number of reference bits corresponding to the current image block; the target bits are obtained by piecewise linear transform of the current block with ref_cost at its complexity level. Refer to the following formula:

$$\text{target\_cost} = \text{ref\_cost} \times g + h;$$

Where g and h are piecewise linear map parameters of target_cost base on ref_cost, g represents a scaling ratio for target_cost, and h represents an offset degree for ref_cost. Parameters g and h are related to image information. For example, for an image with bpp of 8 bit and a sampling format of YUV444, when ref_cost>1.1×average bit number (ave_cost), g=1.8 and h=−9; when ref_cost<0.9×ave_cost, g=1.2 and h=−6. Wherein, g and h are used to modify ref_cost according to ave_cost to obtain target_cost.

Case 2: the target_cost is determined according to the complexity information.

Specifically, there are I pieces of complexity information, J types of modes, I×J categories are classified, and each category corresponds to a target_cost respectively. For example, the complexity information indicates that the current block is simple or complex, and the modes include Intra block copy (IBC) mode and non-IBC mode, there are four categories, including simple IBC, simple non-IBC, complex IBC and complex non-IBC, and each category corresponds to a target_cost. Firstly, the number of reference bits for each category is estimated: ref_cost=real_bit+qp/8, to update the bit predicted number for each category (pred_cost t)=0.75× pred_cost$_{t-1}$+0.25×ref_cost; then the coefficient is calculated: scale=bpp/(avg_complexity−offset), wherein avg_complexity represents the sliding average complexity of all blocks up to the current block position, and offset is related to the image format and bpp; target_cost=scale×(pred_cost− offset) is finally obtained. Wherein, pred_cost$_{t-1}$ is the number of predicted bits corresponding to the previous image block.

Case 3: the target_cost is determined according to the image information. Image information includes bit width, image sampling format or other information.

Specifically, there are K bit widths and L image sampling formats, K×L categories are classified, and each category corresponds to one target_cost. For example, there are 2 bit widths (8 bit and 12 bit) and 2 image sampling formats (YUV and RGB), and there are 4 types of target_cost, including 8bitYUV, 8bitRGB, 12 bit YUV and 12bitRGB.

Case 4: fullness is acquired, and the target_cost is determined according to fullness in combination with the complexity information of the current block, the buffer status or the image information.

Wherein, the process of acquiring fullness is the same as step S41.

Case 4.1: the target_cost is determined according to fullness and the buffer status.

Specifically, target_cost=m×ref_cost+n×physical_buffer+o, where m and n and o are parameters.

If fullness>0.85, the setting of target_cost is dominated by fullness at this time, that is, the value of n is relatively larger than that of m; if fullness<0.25, m is larger relative to n at this time.

Case 4.2: target_cost is determined according to fullness, image information and complexity information.

Wherein, different fullness corresponds to different minimum target bits (min_target_cost) and maximum target bits (max_target_cost), and target_cost is limited.

For example, for an 8 bit image with a sampling format of YUV444, min_target_cost=bpp×fullness×p1+q1, max_target_cost=bpp×fullness×p2+q2; wherein, p1 and q1 make min_target_cost smaller when fullness<0.25, and make min_target_cost larger when fullness>0.75; p2 and q2 make max_target_cost smaller when fullness<0.25, and enable the max_target_cost larger when fullness>0.75.

Case 4.3: target_cost is determined according to the fullness and the complexity information.

For a simple block with lower complexity, when fullness<0.1, m>0, n=0, that is, ref_qp increases with the increase of fullness; when 0.1≤fullness≤0.9, m=0, n>0, the value of n will be updated with the image block, and ref_qp will remain constant within a certain fullness with the increase of fullness; when fullness>0.9, m>0, that is, ref_qp increases with the increase of fullness; operations for ordinary blocks and complex blocks are similar. For constant sections of the simple block and the ordinary block, when the actual encoding bits are greater than the target bits, the value of n increases, and otherwise decreases, that is, the actual bit consumption is less than or equal to target_cost by adjusting n; for a complex block, the actual bit consumption is greater than or equal to target_cost by adjusting n (if the simple block and the ordinary block do not save bits, complex blocks have no extra bits available, and the actual bit consumption thereof must be strictly less than or equal to target_cost).

Optionally, the video codec determines the reference quantization parameter of the current block according to the target bits. Refer to the following formula:

$$\text{ref\_}qp=\text{target\_cost}\times u+v;$$

Wherein u and v are parameters. u and v are piecewise linear mapping parameters of ref_qp based on target_cost, u represents a scaling ratio for target_cost, and v represents an offset degree for target_cost. For example, u=8/3 and v=ref_cost×8.

It can be seen that the reference quantization parameter obtained based on the target bits corresponding to the complexity_level can be flexibly adjusted according to the volume of the target bits, so that the quantization parameter can be adjusted more flexibly.

The implementation of step S32 will be described below.

Optionally, the video codec determines the quantization parameter of the current block according to the reference quantization parameter of the current block. Specifically, refer to the following formula: qp=ref_qp×x+y. Wherein x and y are piecewise linear mapping parameters of qp based on ref_qp, x represents a scaling ratio for ref_qp, and y represents an offset degree for ref_qp.

Specifically, the video codec can determine the quantization parameter according to the reference quantization parameter through the following cases.

Case 1: the parameters x and y are determined according to the image information.

When x is 1 and y is 0, the reference quantization parameter is the quantization parameter.

Alternatively, for the image with a sampling format of YUV444, x=1/3 and y=0 for each channel. Or x=1/2, y=0 for Y channel, x=1, y=0 for chrominance channel.

Alternatively, when ref_qp is within (0,16), x=1/4, y=0 for Y channel, x=1/2, y=0 for chrominance channel; when ref_qp is within (17,32), x=1/2, y=2 for Y channel, x=1/2, y=4 for chrominance channel; when ref_qp is within (33, 63), x=1 and y=0 for Y channel and x=1 and y=0 for chrominance channel.

Case 2: the parameters x and y are determined according to the complexity information.

Specifically, the video codec determines a weighting coefficient according to the complexity information of the current block, and the weighting coefficient is used to adjust the quantization parameter of the current block according to the complexity of the current block; according to the weighting coefficient and the reference quantization parameter of the current block, the quantization parameter of the current block is determined.

For example, the above weighting coefficient can be regarded as the following x, and the weighting coefficient can be determined by the following expression:

$$x=\text{block\_complexity11}>/(\text{block\_complexity1}\times w11+\\ \text{block\_complexity2}\times w12+\text{block\_complexity3}\times\\ w13)$$

Wherein, w represents the weight, including w11, w12, w13, 0≤w11, w12, w13≤1. block_complexity1, block_complexity2 and block_complexity3 respectively represent the complexity information of the three channels of the current block.

Through this possible implementation, the quantization parameter of the current block can be adjusted by using the weighting coefficient determined by the complexity information of the current block, so that the quantization parameter of the current block can be adjusted adaptively according to the complexity information of the current block, and the accuracy of determining the quantization parameter of the current block and video en/decoding can be improved.

Case 3: a weighting coefficient is determined according to the complexity information of M en/decoded image blocks and the complexity information of the current block; the quantization parameter of the current block is determined according to the weighting coefficient and the reference quantization parameter of the current block.

For example, the above weighting coefficient can be regarded as the following x, and the weighting coefficient can be determined by the following expression:

Wherein window_complexity represents the complexity information of the image blocks included in the sliding window. With the change of the image block in the sliding window, window_complexity is updated accordingly. Specifically, it can be calculated according to the following formula.

$$window\_complexity_x =$$

$$window\_complexity_{x-1} \times 0.75 + block\_complexity \times 0.25;$$

$$x = window\_complexity1_x \times w14/(window\_complexity1_x \times w14 +$$

$$window\_complexity2_x + w15 + window\_complexity3_x \times w16)$$

Wherein w10, w11 and w12 represent weights, $0 \leq w10$, w11, $w12 \leq 1$, and window complexity; represents the complexity information of the first M en/decoded image blocks from z block. Similarly, window_complexit $y_{z-1}$ represents the complexity information of the first M en/decoded image blocks from z-1 block. window_complexity1, window_complexity2, and window_complexity3, respectively represent the complexity information of three different image blocks included in the sliding window.

y=0.

According to the weighting coefficient and the reference quantization parameter of the current block, the implementation of determining the quantization parameter of the current block can refer to the following formula: qp=ref_qp x x+y, which is not be described in detail here.

S603: performing, by the video codec, en/decoding on the current block based on the quantization parameter.

Optionally, the complexity information of the current block is calculated based on the code rate control unit of the current block, and the quantization parameter of the current block is the quantization parameter of the code rate control unit of the current block, and the video codec performs en/decoding on the current block based on the quantization parameter of the current block, including: determining the quantization parameter of the en/decoding unit of the current block according to the quantization parameter of the code rate control unit; performing the en/decoding on the current block according to the quantization parameter of the encoding unit. Wherein, when encoding the current block, the above en/decoding unit is an encoding unit, and when decoding the current block, the above en/decoding unit is a decoding unit.

It can be understood that when the code rate control module determines the quantization parameter, it is calculated according to the code rate control unit. When the size of the code rate control unit is larger than the size of the basic encoding unit (quantization unit), it means that multiple basic encoding units adopt the same quantization parameter. When the size of the code rate control unit is equal to the size of the quantization unit, one-to-one corresponding quantization parameters can be acquired. When the size of the code rate control unit is smaller than the size of the quantization unit, it means that one quantization unit corresponds to multiple quantization parameters. At this time, it is necessary to adopt a certain strategy to determine the final quantization parameter for the quantization unit based on the multiple quantization parameters.

In a first possible implementation, the video codec divides the quantization unit based on the code rate control unit, that is, makes the multiple quantization parameters correspond to multiple quantization units one by one.

In a second possible implementation, multiple quantization parameters are weighted or the minimum value therein is selected to obtain a quantization parameter, which corresponds to the quantization unit.

In a third possible implementation, multiple quantization parameters are merged based on complexity information and buffer status. Exemplarily, the quantization parameters with similar complexity information are merged into one, and the similar complexity information can be multiple pieces of complexity information that meet a certain range of difference.

Through the above possible implementations, the quantization parameter of the encoding unit of the current block is determined according to the quantization parameter of the code rate control unit, so that the quantization parameter of the encoding block can be matched with the code rate control strategy, and the en/decoding result can take into account the image quality and improve the en/decoding efficiency while taking into account the code rate control requirements.

The above merging method can obtain a quantization parameter by weighting similar quantization parameters, or select the minimum value among similar quantization parameters as the merged quantization parameter.

The first possible implementation can be then adopted to the one or more merged quantization parameters, so that multiple quantization units corresponding to the quantization parameters are obtained; alternatively, the second possible implementation above can also be adopted to obtain a quantization parameter corresponding to a quantization unit. There is no limitation in this regard.

It can be understood that, step S603 includes that the video codec performs encoding or decoding on the current block based on the quantization parameter.

Optionally, when encoding, the video encoder encodes the complexity information of the current block into the code stream or encodes the quantization parameter of the current block into the code stream. Accordingly, the decoding end acquires the complexity information in the code stream to calculate the quantization parameter for decoding, or the decoding end acquires the quantization parameter in the code stream for decoding. Of course, the video encoder can also encode both of the above information into the code stream.

It should be noted that when the video encoder encodes the complexity information of the current block into the code stream, the video decoder correspondingly acquires the complexity information to calculate the quantization parameter, but the video decoder may not update other parameters by adopting the complexity information. Exemplarily, the above determination method of target_cost involves being updated according to the complexity information of the current block. However, in a specific implementation, the results of updating based on the complexity may be different from the results of updating itself based on historical information (such as the number of bits occupied by the en/decoded image block and the quantization parameter of the en/decoded image block). In this case, the parameter may not be updated by adopting the complexity information, and the original method of updating parameter may still be retained.

Calculating the complexity information of the current block through the above method is beneficial to determine more accurate en/decoding parameter for the current block, such as the quantization parameter, thus improving the en/decoding efficiency of the image.

Optionally, the code stream obtained based on the above en/decoding method can also perform the following code stream grouping methods before being encoded into the code stream.

As can be seen from the above description of the slice, an image can be divided into multiple slices based on an image width (image_width) and an image height (image_height), wherein image_width is used to specify the width of the luminance component of the image, that is, the number of samples in the horizontal direction, which is a 16-bit unsigned integer. The unit of image_width should be the number of samples per row of the image. The upper left corner sample of the displayable area should be aligned with the upper left corner sample of the decoded image. The value of ImageWidth is equal to the value of image_width, and the value of ImageWidth should not be 0 and should be an integer multiple of 16. image_height is used to specify the height of the luminance component of the image, that is, the number of scanning rows in the vertical direction, which is a 16-bit unsigned integer. The unit of image_height should be the number of rows of image samples. The value of ImageHeight is equal to the value of image_height, the value of ImageHeight should not be 0 and should be an integer multiple of 2.

A slice is a fixed rectangular area in the image, so it can also be called a rectangular slice, which contains parts of several encoding units within the image, and the slices do not overlap each other. The division method is not limited, and CUs can be further divided based on slices. Wherein, when dividing into slices based on the image, in order to divide to obtain an integer number of slices, the current image width or image height may be adjusted. As shown in a schematic diagram of an image boundary provided in FIG. 13a, that is, the boundary of the image displayable area, wherein real_width is the actual image width and real_height is the actual image height. In order to divide into the slice, the width and height of the image are adaptively increased to obtain the image_width and image_height in the figure.

A slice has a width (slice_width) and a height (slice_height). For example, the number of slices in the horizontal direction of an image can be represented by SliceNum X, and the number of slices in the vertical direction of an image can be represented by SliceNum Y, as shown in a schematic diagram of a strip provided in FIG. 13b.

Figure 14A:
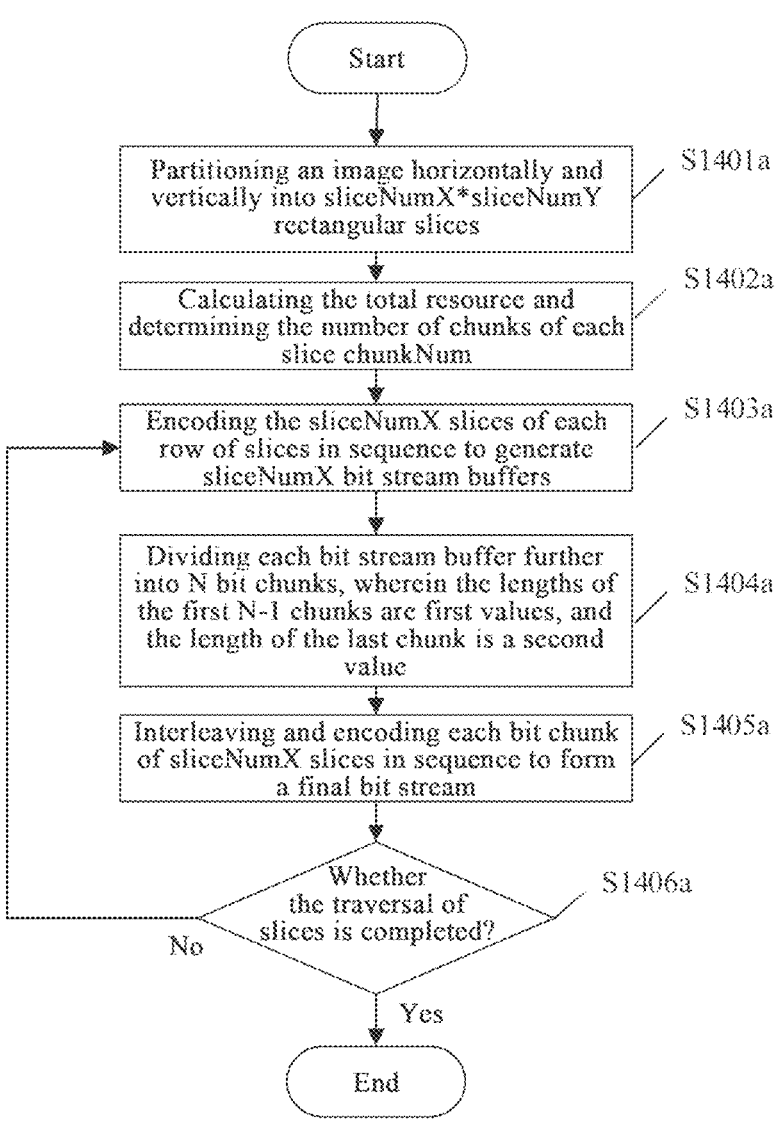
FIG. 14*a* is a schematic diagram of a flowchart of a code stream grouping method at an encoding end provided by an embodiment of the present application.
Figure 14B:
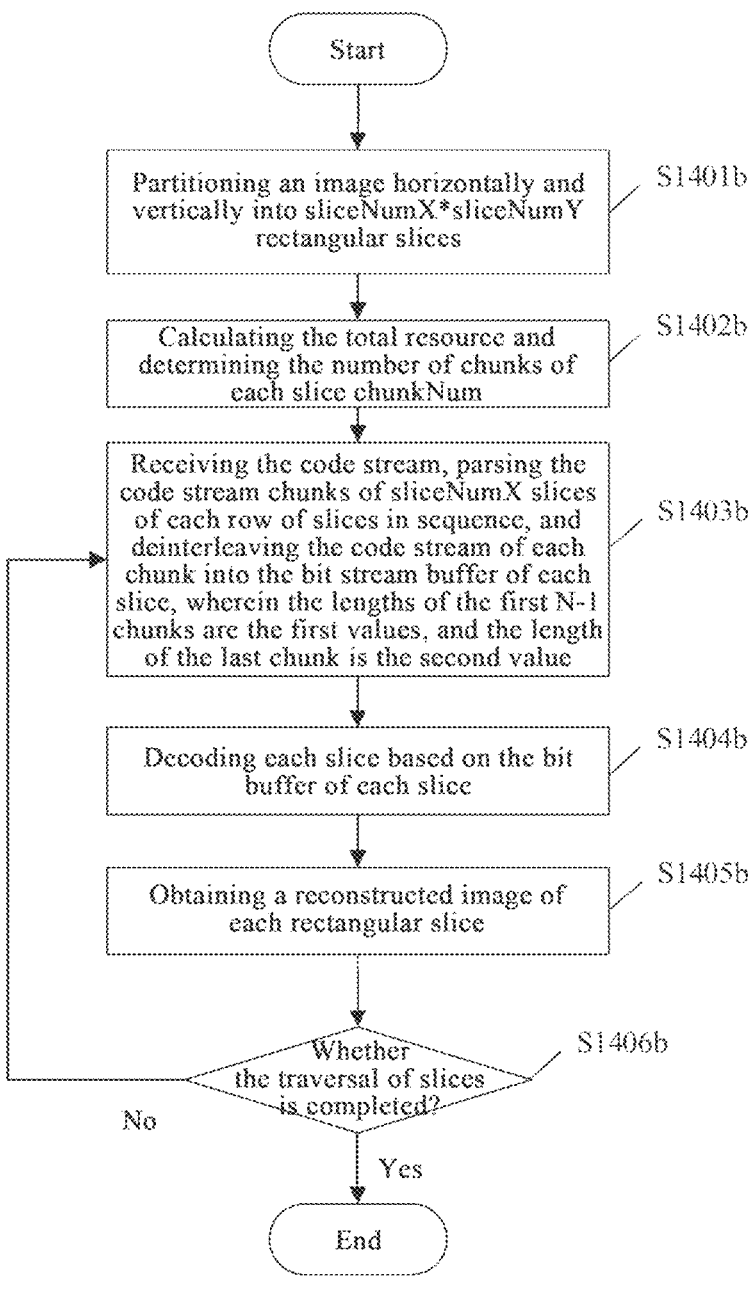
FIG. 14*b* is a schematic diagram of a flowchart of a code stream grouping method at a decoding end provided by an embodiment of the present application.

In a code stream grouping method, the length of each slice code stream is fixed, in which the length of the first R-1 chunks are fixed and the length of the last chunk is not fixed. As shown in FIG. 14a and FIG. 14b, they are flowchart diagrams indicating the code stream grouping method at the encoding end and the decoding end respectively.

As shown in FIG. 14a, a flowchart diagram of a code stream grouping method at an encoding end provided by an embodiment of the present application includes steps S1401a-S1406a.

S1401a: partitioning an image horizontally and vertically into sliceNumX*sliceNumY rectangular slices.

The image is divided in horizontal and vertical directions, and sliceNumX rectangular slices are obtained in horizontal direction and sliceNumY rectangular slices are obtained in vertical direction. The above image refers to the above-mentioned image to be processed, so that after the image to be processed is divided in the horizontal direction and the vertical direction, slices in the horizontal direction and slices in the vertical direction can be obtained, so that the above-mentioned sliceNumX and sliceNumY, that is, a first slice number and a second slice number, can also be obtained.

S1402a: calculating the total resource and determining the number of chunks of each slice chunkNum.

Wherein, total_resoure refers to the resource occupied by the slice calculated based on the number of bits required for each pixel point.

$$total\_resource = ((slice\_width \times slice\_height \times$$
$$target\ pixel\ depth\ (target\_bpp) + 7) >> 3) << 3.$$

The number of chunks (chunkNum) is determined according to the total resource total_resoure, $$chunkNum = total\_resoure/size + n,$$

Wherein, $n = total\_resoure\ \%\ size == 0?0:1$, and size is an integer multiple of 8, for example, $size = target\_bpp \times 32 \times block\_num$, Wherein, block_num is a preset configuration parameter and block_num is an integer multiple of 4.

S1403a: encoding the sliceNumX slices of each row of slices in sequence to generate sliceNumX bit stream buffers.

Wherein, the bit stream buffer can be represented by slicebuffer[sliceNumX], and the bit stream buffer can also be zerofilled and byte-aligned.

In this step, encoding each slice can be understood as encoding each image block in the slice according to the solution provided in the previous embodiment to obtain the encoded data of each image block in the slice.

S1404a: dividing each bit stream buffer further into N bit chunks, wherein the lengths of the first N-1 chunks are first values, and the length of the last chunk is a second value.

In this step, the above bit chunk can also be called code stream chunk, and the N represents the number of chunks, that is, the chunkNum.

Specifically, each bit stream buffer is divided further into chunkNum chunks, and the calculation method of chunksize is: the lengths of the first chunkNum−1 chunks are chunksize=size1, and the length of the last chunk is size2, where size1=size and size2=total resource−(chunkNum−1)× size. Wherein, the first value can be size1 and the second value can be size2.

S1405a: interleaving and encoding each bit chunk of sliceNumX slices in sequence to form a final bit stream.

The sliceNum slices in a row of slices are encoded chunkNum times in sequence, and the chunks of each slice are interleaved together each time to form the final code stream.

S1406a: judging whether the encoding of slice is completed, and if the encoding of slice is not completed, returning to S1403a to encode the next row of slices.

As shown in FIG. 14b, a flowchart diagram of a code stream grouping method at a decoding end provided by an embodiment of the present application includes steps S1401b-S1406b.

S1401b: partitioning an image horizontally and vertically into sliceNumX*sliceNumY rectangular slices.

This step is similar to the above step S1401a, and a first slice number of slices in the horizontal direction and a second slice number of slices in the vertical direction in the image can be obtained. Similarly, the above image in this step is the above-mentioned image to be processed.

Because the decoding end can not obtain the image to be processed itself before the decoding is completed, in view of this, in this step, the actual image width and the actual image height of the image to be processed can be obtained from the video header information or the image header information in the received code stream, and then the above sliceNumX (the first slice number) and sliceNumY (the second slice number) can be calculated according to the actual image width and the actual image height.

Of course, the above sliceNumX and sliceNumY can also be obtained directly from the video header information or image header information in the code stream.

S1402*b*: calculating the total resource and determining the number of chunks of each slice chunkNum.

This step is the same as the above step S1402*a*.

S1403*b*: receiving the code stream, parsing the code stream chunks of sliceNumX slices of each row of slices in sequence, and deinterleaving the code stream of each chunk into the bit stream buffer of each slice, wherein the lengths of the first N-1 chunks are the first values, and the length of the last chunk is the second value.

The decoding end can continuously receive the code streams, and of course, it can directly obtain all the code streams to be decoded.

The number of code stream chunks in each slice is the above chunkNum.

When deinterleaving, the code stream chunks of each slice are deinterleaved in an unit of slice, and then the deinterleaving results are stored in the bit stream buffer of the condition.

Optionally, the code stream is received, and is parsed chunkNums times in sequence, and slicenumX code stream chunks deinterleaved into the code stream buffer of each slice at each parsing time. The calculation method of chunksize is: the lengths of the first chunkNum−1 chunks are chunksize=size1, and the length of the last chunk is size2, where size1=size, and size2=total_resource−(chunkNum−1)×size.

S1404*b*: decoding each slice based on the bit buffer of each slice.

S1405*b*: obtaining a reconstructed image of each rectangular slice.

S1406*b*: judging whether the parsing of slice code stream is completed, and if the parsing of slice code stream is not completed, returning to S1403*b* to parse the next row of slices in sequence.

As shown in the schematic diagram of interleaving of chunks based on a code stream grouping method provided in FIG. 15, when sliceNumX is 2, the schematic diagram of interleaving of chunks based on the above-mentioned code stream grouping method is shown.

Wherein, the chunk R in FIG. 15 characterizes the Rth chunk, the length of the Rth chunk is not fixed, and the lengths of other R-1 chunks are fixed. In the figure, the lengths of other R-1 chunks are characterized by size 1, and the length of the Rth chunk is characterized by size 2.

The code streams characterized in FIG. 15(*c*) are grouped according to size 1 and size 2, respectively. When the size 1 is smaller than the size 2, the schematic diagram of interleaving the grouped chunks is shown in FIG. 15(*a*), and when the size 1 is larger than the size 2, the schematic diagram of interleaving of the grouped chunks is shown FIG. 15(*b*).

Figure 16B:
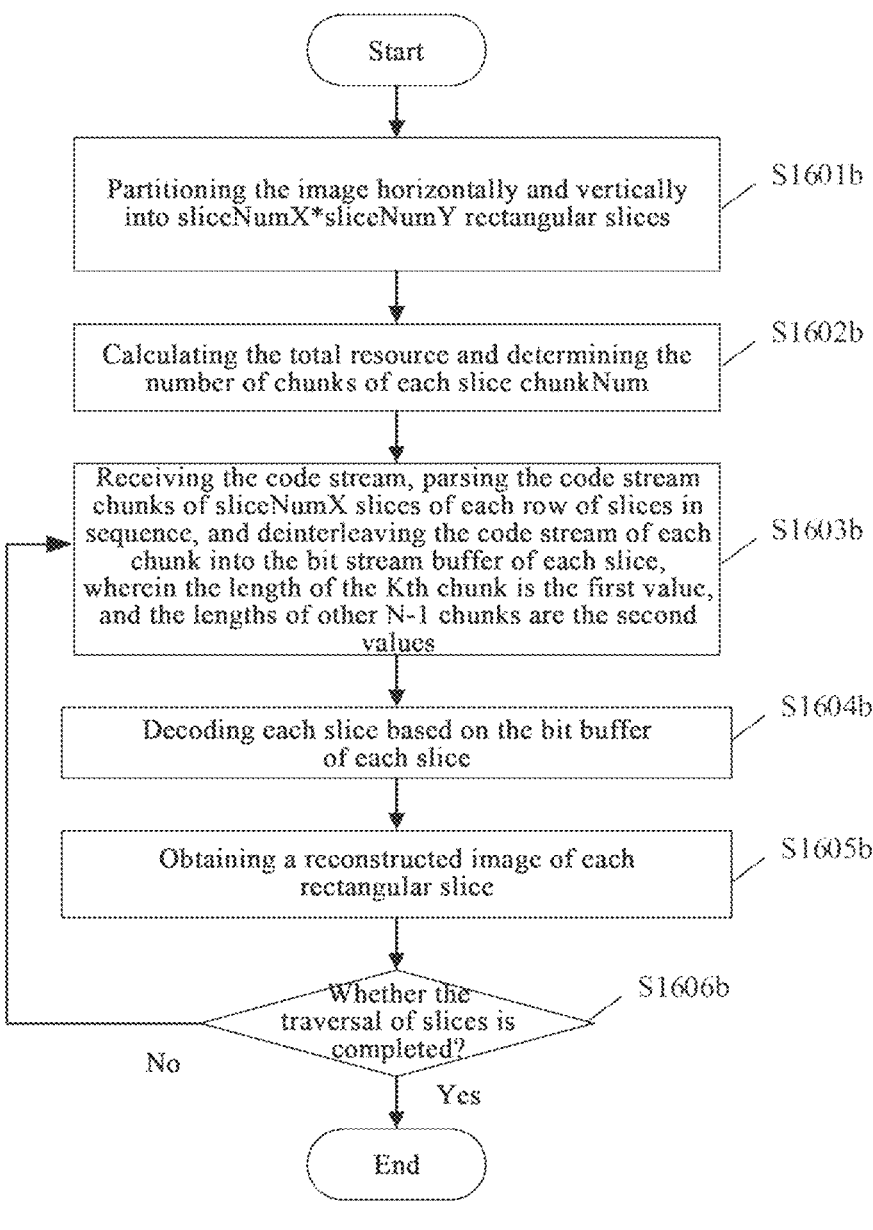
FIG. 16*b* is a schematic diagram of a flowchart of a code stream grouping method at a decoding end provided by an embodiment of the present application.

In another code stream grouping method, the length of each slice code stream is fixed, in which the length of the rth chunk is not fixed, and the lengths of other r-1 chunks are fixed. As shown in FIG. 16*a* and FIG. 16*b*, they are flowchart diagrams indicating a code stream grouping method at the encoding end and the decoding end respectively.

As shown in FIG. 16*a*, it is a flowchart diagram of a code stream grouping method at the encoding end, including steps S1601*a*-S1606*a*.

S1601*a*: partitioning the image horizontally and vertically into sliceNumX*sliceNum Y rectangular slices.

This step is the same as the above step S1401*a*.

S1602*a*: calculating the total resource and determining the number of chunks of each slice chunkNum.

This step is the same as the above step S1402*a*.

S1603*a*: encoding sliceNumX slices of each row of slices in sequence to generate slicenumX bit stream buffers.

S1604*a*: dividing bit stream buffer of each slice further into N bit chunks, wherein the length of the Kth chunk is a first value, and the lengths of other N-1 chunks are second values.

In this step, the bit chunk can also be called code stream chunk, and the above N represents the number of chunks, i.e., the above chunkNum.

For example, each bit stream buffer can be divided into chunkNum chunks, and the length of each chunk chunksize not fixed. The first value can be size1 and the second value can be size2. Wherein, the calculation method of chunksize is: the length of the kth chunk is size1, and the lengths of other chunkNum−1 chunks are chunksize=size2, where size 2=size, size 1=total_resort−(chunkNum−1)×size, and the value range of k is 1~chunkNum.

S1605*a*: interleaving and encoding each bit chunk of sliceNumX slices in sequence to form a final bit stream.

The sliceNum slices in a row of slices are encoded chunkNum times in sequence, and the chunks of each slice are interleaved together each time to form the final bit stream.

S1606*a*: judging whether the encoding of slice is completed, and if the encoding of slice is not completed, returning to S1603*a* to encode the next row of slices.

As shown in FIG. 16*b*, it is a flowchart diagram of a code stream grouping method at the decoding end, including steps S1601*b*-S1606*b*.

S1601*b*: partitioning the image horizontally and vertically into sliceNumX*sliceNumY rectangular slices.

This step is the same as the above step S1401*b*.

S1602*b*: calculating the total resource and determining the number of chunks of each slice chunkNum.

This step is the same as the above step S1402*b*.

S1603*b*: receiving the code stream, parsing the code stream chunks of sliceNumX slices of each row of slices in sequence, and deinterleaving the code stream of each chunk into the bit stream buffer of each slice, wherein the length of the Kth chunk is the first value, and the lengths of other N-1 chunks are the second values.

The code stream is received, and the sliceNumX slices of each row of slices is parsed chunkNum times in sequence, and deinterleaving the sliceNumX code stream chunks into the code stream buffer of each slice at each parsing time. The calculation method of chunksize is: the length of the kth chunk is size1, and the lengths of other chunkNum−1 chunks are chunksize=size2, wherein size2=size, size1=total_resort−(chunkNum−1)×size, and the value range of k is 1~chunkNum.

S1604*b*: decoding each slice based on the bit buffer of each slice.

S1605*b*: obtaining a reconstructed image of each rectangular slice.

S1606*b*: judging whether the slice code stream parsing is completed, and if the slice code stream parsing is not completed, returning to S1603*b* to parse the next row of slices in sequence.

As shown in the schematic diagram of interleaving of chunks based on a code stream grouping method provided in FIG. 17, when sliceNumX is 2, the schematic diagram of interleaving of chunks based on another code stream grouping method is shown.

Wherein, the chunk r in FIG. 17 characterizes the rth chunk, the chunk R characterizes the Rth chunk, the length of the rth chunk is not fixed, and the lengths of the other R-1 chunks are fixed. In the figure, the lengths of other R-1 chunks are characterized by size 1, and the length of the rth chunk is characterized by size 2.

The code streams characterized in FIG. 17(*c*) are grouped according to size 1 and size 2, respectively. When the size 1 is smaller than the size 2, the schematic diagram of interleaving of the grouped chunks is shown in FIG. 17(*a*), and when the size 1 is larger than the size 2, the schematic diagram of interleaving of the grouped chunks is shown in FIG. 17(*b*).

It should be noted that all the solutions not specified in the above solutions can be performed at either the decoding side or the encoding side.

It should be noted that, in the absence of conflict, part or all of the contents of any of the above embodiments can constitute a new embodiment.

The embodiment of the present application provides a video en/decoding device, which can be a video codec, a video encoder or a video decoder. Specifically, the video en/decoding device is used to perform the steps performed by the video codec in the above video en/decoding method. The video en/decoding device provided by the embodiment of the present application may include modules corresponding to the corresponding steps.

The embodiment of the present application can divide the video en/decoding device into functional modules according to the above method embodiments. For example, division of each functional module can correspond to each function, or two or more functions can be integrated into one processing module. The above integrated modules can be realized in the form of hardware or software functional modules. The division of modules in the embodiment of the present application is schematic, only a division of functions for logical, and there may be another division method in actual implementation.

In the case of division of each functional module corresponding to each function, FIG. 18 is a schematic diagram of a video en/decoding device provided by an embodiment of the present application. As shown in FIG. 18, the video en/decoding device 180 includes an acquiring module 1801, a determining module 1802 and an en/decoding module 1803.

The acquiring module 1801 is configured to acquire the complexity information of the current block in the image to be processed, wherein the complexity information of the current block is obtained by calculating at least one angle gradient of the current block at least according to the pixel values of the current block, such as the above step S601.

The determining module 1802 is configured to determine the quantization parameter of the current block according to the complexity information of the current block, such as step S602 described above.

The en/decoding module 1803 is configured to perform en/decoding on the current block based on the quantization parameter, such as step S603.

In an example, the acquiring module 1801 is specifically configured to calculate at least one angle gradient of the current block based on the pixel values of the current block and the reconstructed values of the en/decoded pixel values of the current block; and acquire the complexity information of the current block according to at least one angle gradient of the current block.

In an example, the acquiring module 1801 is specifically configured to calculate at least one angle gradient of the current block based on the pixel values of the current block and the pixel values adjacent to the current block in the image to be processed; acquire the complexity information of the current block according to at least one angle gradient of the current block.

In an example, the acquiring module 1801 is specifically configured to acquire the prediction angle adopted by the angle prediction mode of the current block; calculate the angle gradient based on the prediction angle to acquire the corresponding complexity information; and take the corresponding complexity information as the complexity information of the current block.

In an example, the current block is an N-channel image block, and the acquiring module 1801 is specifically configured to acquire the complexity information of each channel image block based on the pixel values of each channel image block in the N-channel image block; wherein N is an integer greater than zero; determine the complexity information of the current block based on the complexity information of each channel image block.

In an example, an acquiring module 1801 is specifically configured to divide each channel image block into at least two sub-blocks; determine the complexity information of at least two sub-blocks of each channel image block; and determine the complexity information of the respective channel image block in each channel image block based on the complexity information of at least two sub-blocks of each channel image block.

In an example, the acquiring module 1801 is specifically configured to determine the minimum value of the complexity information of at least two sub-blocks of each channel image block as the complexity information of the respective channel image block.

In an example, the acquiring module 1801 is specifically configured to determine the minimum value in the complexity information of all of the channel image blocks as the complexity information of the current block.

In an example, the acquiring module 1801 is specifically configured to determine a complexity level of each channel image block based on the complexity information of each channel image block; determine the complexity information of the current block based on the complexity level of each channel image block.

In an example, the determining module 1802 is specifically configured to determine reference quantization parameter of the current block according to the complexity information of the current block; determine a quantization parameter of the current block according to the reference quantization parameter of the current block.

In an example, when the video en/decoding method is a video encoding method, the determining module 1802 is specifically configured to acquire buffer status of an image to be processed, wherein the buffer status is used to characterize the number of bits occupied by image blocks that has been encoded in the image to be processed in a buffer, and the buffer is used to control the uniform output of the code stream of the image to be processed; determine the reference quantization parameter of the current block according to a correspondence between the buffer status and the complexity information of the current block.

In an example, the determining module 1802 is specifically configured to determine a complexity level of the current block; determine corresponding target bits according to the complexity level of the current block, wherein the target bits refer to the number of bits occupied by the current block in the code stream; and acquire a reference quantization parameter of the current block according to the target bits.

In an example, the determining module 1802 is specifically configured to determine a weighting coefficient according to the complexity information of the current block, wherein the weighting coefficient is used to adjust a quantization parameter of the current block according to the complexity of the current block; determine a quantization parameter of the current block according to the weighting coefficient and the reference quantization parameter of the current block.

In an example, the complexity information of the current block is calculated based on a code rate control unit of the current block, wherein the code rate control unit is a basic processing unit for calculating the complexity information of the current block; the quantization parameter of the current block is the quantization parameter of the code rate control unit of the current block, and the en/decoding module 1803 is specifically configured to determine the quantization parameter of the en/decoding unit of the current block according to the quantization parameter of the code rate control unit; perform en/decoding on the current block according to the quantization parameter of the en/decoding unit.

All the related contents of each step involved in the above method embodiment can be referred to the description of function of the corresponding functional module, which is not repeated here.

Of course, the video en/decoding device provided by the embodiment of the present application includes but is not limited to the above modules, for example, the video en/decoding device may also include a storage module 1804.

The storage module 1804 can be configured to store the program code and data of the video en/decoding device.

An embodiment of the present application further provides a video decoder, which includes a processor and a memory; wherein, the memory stores instructions executable by the processor;

the processor, when configured to execute the instructions, causes the video decoder to realize the video image decoding method in the above embodiment.

An embodiment of the present application further provides a video encoder, which includes a processor and a memory; wherein, the memory stores instructions executable by the processor;

the processor, when configured to execute the instructions, causes the video encoder to realize the video image encoding method in the above embodiment.

An embodiment of the present application further provides a video encoding and decoding system, which includes a video encoder and a video decoder, wherein the video encoder is configured for performing any one of the video en/decoding methods provided in the above embodiment, and the video decoder is configured for performing any one of the video en/decoding methods provided in the above embodiment.

The embodiment of the present application further provides an electronic device, which includes the above video en/decoding device 180, and the video en/decoding device 180 executes any one of methods performed by a video codec provided above.

The embodiment of the present application also provides a computer-readable storage medium storing a computer program, and when the computer program is run on a computer, it cause the computer to perform any one of methods performed by the video decoder provided above.

The explanation of related contents and the description of beneficial effects of any of the computer-readable storage media provided above can be referred to the above corresponding embodiments, and will not be repeated here.

An embodiment of the present application also provides a chip. The chip integrates one or more ports and a control circuit for realizing the functions of the video en/decoding apparatus 100. Optionally, the functions supported by the chip can be referred to the above contents and will not be repeated here. Those skilled in the art can understand that all or part of the steps to realize the above-mentioned embodiments can be completed by instructing related hardware through programs. The programs can be stored in a computer-readable storage medium. The storage medium mentioned above can be read-only memory, random access memory, etc. The processing unit or processor can be a central processing unit, a general processor, an application specific integrated circuit (ASIC), a microprocessor (digital signal processor, DSP), a field programmable gate array (FPGA) or other programmable logic devices, transistor logic devices, hardware components or any combination thereof.

An embodiment of the present application also provides a computer program product containing instructions, which, when run on a computer, cause the computer to perform any one of the methods in the above embodiments. The computer program product includes one or more computer instructions. When computer program instructions are loaded and executed on a computer, the flow or function according to the embodiment of the present application is generated in whole or in part. The computer can be a general-purpose computer, a special-purpose computer, a computer network, or other programmable devices. Computer instructions can be stored in a computer-readable storage medium or transmitted from one computer-readable storage medium to another. For example, computer instructions can be transmitted from one website, computer, server or data center to another website, computer, server or data by wired (such as coaxial cable, optical fiber, digital subscriber line (DSL)) or wireless (such as infrared, wireless, microwave, etc.). Computer-readable storage media can be any available media that can be accessed by a computer or contain one or more data storage devices such as servers and data centers that can be integrated with media. Available media can be magnetic media (e.g., floppy disk, hard disk, magnetic tape), optical media (e.g., DVD), or semiconductor media (e.g., SSD), etc.

It should be noted that the devices for storing computer instructions or computer programs provided by the embodiments of the present application, such as, but not limited to, the memories, computer-readable storage media and communication chips, are all non-volatile.

In the above embodiments, it can be realized in whole or in part by software, hardware, firmware or any combination thereof. When implemented using a software program, it can be fully or partially implemented in the form of a computer program product. The computer program product includes one or more computer instructions. When computer program instructions are loaded and executed on a computer, the flow or function according to the embodiment of the present application is generated in whole or in part. The computer can be a general-purpose computer, a special-purpose computer, a computer network, or other programmable devices. Computer instructions can be stored in a computer-readable storage medium or transmitted from one computer-readable storage medium to another. For example, computer instructions can be transmitted from one website, computer, server or data center to another website, computer, server or data by wired (such as coaxial cable, optical fiber, digital subscriber line (DSL)) or wireless (such as infrared, wireless, microwave, etc.). Computer-readable storage media can be any available media can be accessed by a computer or contain one or more data storage devices such as servers and data centers that can be integrated with media. Available media can be magnetic media (e.g., floppy disk, hard disk, magnetic tape), optical media (e.g., DVD), or semiconductor media (e.g., solid state disk (SSD)), etc.

Although the present application has been described herein in combination with various embodiments, in the process of implementing the claimed application, those skilled in the art can understand and realize other variations of the disclosed embodiments by reviewing the drawings, the disclosure and the appended claims. In the claims, the word "comprising" does not exclude other components or steps, and "a" or "an" does not exclude plural cases. A single processor or other unit can realize several functions recited in the claims. Certain measures are recorded in mutually different dependent claims, but this does not mean that these measures cannot be combined to produce good results.

Although the present application has been described in combination with specific features and embodiments thereof, it is obvious that various modifications and combinations can be made without departing from the spirit and scope of the present application. Accordingly, the description and drawings are merely illustrative of the present application as defined by the appended claims, and are deemed to cover any and all modifications, variations, combinations or equivalents within the scope of the present application. Obviously, various modifications and variations can be made to the present application by those skilled in the art without departing from the spirit and scope of the present application. Thus, if these modifications and variations of the present application fall within the scope of the claims of the present application and their technical equivalents, the present application is also intended to include these modifications and variations. The above is only the preferred embodiment of the present application, and it is not used to limit the present application. Any modification, equivalent substitution, improvement, etc. made within the spirit and principle of the present application should be included in the scope of protection of the present application.

The invention claimed is:

1. A video image decoding method, applied to a decoding end, wherein the method comprises:
    acquiring complexity level of a current block in an image to be processed, wherein the complexity level of the current block is obtained by parsing a code stream;
    determining target bits of the current block according to the complexity level of the current block;
    determining a quantization parameter of the current block according to the target bits of the current block;
    decoding the current block based on the quantization parameter.

2. The method according to claim 1, wherein the current block is an N-channel image block, and acquiring the complexity level of the current block in the image to be processed comprises:
    acquiring complexity level of each channel; wherein N is an integer greater than zero;
    determining the complexity level of the current block based on the complexity level of the each channel.

3. The method according to claim 1, wherein determining the quantization parameter of the current block according to the target bits of the current block, comprises:
    determining a reference quantization parameter of the current block according to the target bits of the current block;
    determining the quantization parameter of the current block according to the reference quantization parameter of the current block.

4. The method according to claim 1, wherein, after the step of decoding the current block based on the quantization parameter, the method further comprises:
    acquiring a number of code stream chunks n divided for each slice in the image to be processed, wherein n is a positive integer;
    deinterleaving code stream chunks corresponding to each slice in each row of slices in a code stream to obtain n code stream chunks corresponding to the each slice, wherein the n code stream chunks at least comprises two sizes, at least one of the two sizes is an integer multiple of 8.

5. The method according to claim 4, wherein acquiring n code stream chunks divided for each slice in the image to be processed comprises:
    acquiring a slice width and a slice height of each slice in the image to be processed;
    determining a target number of transmission bits according to the slice width, the slice height and a target number of occupied bits per pixel, and determining the number of code stream chunks according to the target number of the transmission bits and a chunk size value.

6. The method according to claim 5, wherein the chunk size value is derived according to a number of encoding units in the code stream chunk, an encoding unit size and a target pixel depth, and the chunk size value is an integer multiple of 8.

7. The method according to claim 5, wherein deinterleaving the code stream chunks corresponding to each slice in each row of slices in the code stream to obtain n code stream chunks corresponding to the each slice comprises:
    deinterleaving code stream chunks corresponding to X slices of a same row of slices in sequence based on a horizontal direction of the each row of slices in the code stream, to obtain n code stream chunks corresponding to each slice in the X slices, wherein X is a positive integer.

8. The method according to claim 5, wherein, when a length of an actual number of encoding bits is fixed, for the number of code stream chunks of code stream chunks, lengths of remaining code stream chunks except a kth code stream chunk are all a first size, and a length of the kth code stream chunk is a second size; wherein the first size is an integer multiple of 8, the second size is determined based on the target number of the transmission bits, the first size and the n code stream chunks, and the k is a positive integer greater than zero and less than or equal to n.

9. The method according to claim 8, wherein,
    the kth code stream chunk is a last code stream chunk among all code stream chunks.

10. A video decoder, comprising a processor and a memory; wherein,
    the memory stores instructions executable by the processor;
    the processor is configured to, when executing the instructions, cause the video decoder to realize the video image decoding method according to claim 1.

11. A non-transitory computer-readable storage medium having a program stored thereon, wherein the program, when runs on a computer, causes the computer to perform the method according to claim 1.

12. The method according to claim 1, wherein acquiring the complexity level of the current block in the image to be processed comprises:

acquiring a complexity level of each channel in an N-channel image block of the current block in the image to be processed from the code stream; wherein the N-channel image block at least comprises a luminance channel image block and a chrominance channel image block, and N is an integer greater than zero;

obtaining the complexity level of the current block based on a weighted value of the complexity level of each channel.

13. The method according to claim 12, wherein decoding the current block based on the quantization parameter comprises:

performing inverse quantization on the current block based on the quantization parameter of the current block to obtain an inverse quantized transformation coefficient of the current block;

performing inverse transformation on the inverse quantized transformation coefficient of the current block to obtain an inverse transformed residual block;

obtaining a decoded current block based on the inverse transformed residual block.

\*    \*    \*    \*    \*